US010005932B2

(12) United States Patent
Sumnicht et al.

(10) Patent No.: US 10,005,932 B2
(45) Date of Patent: Jun. 26, 2018

(54) GLUE-BONDED MULTI-PLY ABSORBENT SHEET AND POLYVINYL ALCOHOL PLY BONDING ADHESIVE

(71) Applicant: GPCP IP Holdings LLC, Atlanta, GA (US)

(72) Inventors: Daniel W. Sumnicht, Hobart, WI (US); Zhiying Yu, Oshkosh, WI (US); Siddharth S. Vaijapurkar, Appleton, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 0 days. days.

(21) Appl. No.: 15/785,497

(22) Filed: Oct. 17, 2017

(65) Prior Publication Data
US 2018/0037781 A1  Feb. 8, 2018

Related U.S. Application Data

(62) Division of application No. 15/000,071, filed on Jan. 19, 2016, now Pat. No. 9,822,285.

(60) Provisional application No. 62/108,594, filed on Jan. 28, 2015.

(51) Int. Cl.
  *C09J 129/04* (2006.01)
  *C09J 101/02* (2006.01)
(52) U.S. Cl.
  CPC .......... *C09J 129/04* (2013.01); *C09J 101/02* (2013.01); *C08L 2205/16* (2013.01)
(58) Field of Classification Search
  CPC ..... C09J 129/04; C09J 101/02; C08L 2205/16
  USPC ........................................................ 502/402
  See application file for complete search history.

(56) References Cited

U.S. PATENT DOCUMENTS

| 3,414,459 | A | 12/1968 | Wells |
| 3,994,771 | A | 11/1976 | Morgan, Jr. et al. |
| 4,026,752 | A | 5/1977 | Hartbauer et al. |
| 4,102,737 | A | 7/1978 | Morton |
| 4,351,699 | A | 9/1982 | Osborn, III |
| 4,441,962 | A | 4/1984 | Osborn, III |
| 4,447,294 | A | 5/1984 | Osborn, III |
| 4,460,738 | A | 7/1984 | Frentzel et al. |
| 4,528,334 | A | 7/1985 | Knopf et al. |
| 4,529,480 | A | 7/1985 | Trokhan |
| 4,702,496 | A | 10/1987 | Hume, III |
| 5,240,562 | A | 8/1993 | Phan et al. |
| 5,279,767 | A | 1/1994 | Phan et al. |
| 5,622,597 | A | 4/1997 | Callen et al. |
| 5,698,076 | A | 12/1997 | Phan et al. |
| 5,730,839 | A | 3/1998 | Wendt et al. |
| 5,753,079 | A | 5/1998 | Jenny et al. |
| 5,858,554 | A | 1/1999 | Neal et al. |
| 6,342,297 | B1 | 1/2002 | LaBrash |
| 6,734,335 | B1 | 5/2004 | Graef et al. |
| 7,201,815 | B2 | 4/2007 | Muvundamina |
| 7,585,388 | B2 | 9/2009 | Yeh et al. |
| 7,585,389 | B2 | 9/2009 | Yeh et al. |
| 7,614,110 | B2 | 11/2009 | Akai et al. |
| 7,642,226 | B2 | 1/2010 | Verrall et al. |
| 7,662,257 | B2 | 2/2010 | Edwards et al. |
| 7,700,764 | B2 | 4/2010 | Heijnesson-Hultén |
| 7,736,464 | B2 | 6/2010 | Kokko |
| 7,799,402 | B2 | 9/2010 | Redmann et al. |
| 7,850,823 | B2 | 12/2010 | Chou et al. |
| 7,951,266 | B2 | 5/2011 | Kokko et al. |
| 7,967,933 | B2 | 6/2011 | Redmann et al. |
| 8,287,692 | B2 | 10/2012 | Miyawaki et al. |
| 8,287,986 | B2 | 10/2012 | Huss et al. |
| 8,377,563 | B2 | 2/2013 | Miyawaki et al. |
| 8,409,404 | B2 | 4/2013 | Harper et al. |
| 8,546,558 | B2 | 10/2013 | Ankerfors et al. |
| 8,647,468 | B2 | 2/2014 | Heiskanen et al. |
| 8,728,273 | B2 | 5/2014 | Heiskanen et al. |
| 8,747,612 | B2 | 6/2014 | Heiskanen et al. |
| 8,778,134 | B2 | 7/2014 | Vehvilainen et al. |
| 8,778,138 | B2 | 7/2014 | Super et al. |
| 8,992,728 | B2 | 3/2015 | Isogai et al. |
| 9,000,073 | B2 | 4/2015 | Ceulemans et al. |
| 2009/0042003 | A1 | 2/2009 | Govang et al. |
| 2009/0308552 | A1 | 12/2009 | Yano et al. |
| 2010/0285295 | A1 | 11/2010 | Wang et al. |
| 2010/0300605 | A1 | 12/2010 | Redmann et al. |

(Continued)

FOREIGN PATENT DOCUMENTS

| EP | 0947549 A1 | 10/1999 |
| EP | 2526158 A1 | 11/2012 |

(Continued)

OTHER PUBLICATIONS

Garcia-Ochoa F., et al., "Xanthan gum: production, recovery, and properties", Biotechnology Advances, 2000, 549-579, vol. 18, Elsevier Science Inc.

Lu, J., et al., "Preparation and properties of microfibrillated cellulose polyvinyl alcohol composite materials", Composites: Part A (2008), pp. 738-746, vol. 39, Elsevier Ltd.

Richter, K., et al., "Performance of cellulose nanofibrils in wood adhesives", Proceeding of Swiss Bonding 09 (2009), pp. 239-246.

Virtanen, S., et al., "Modified nanofibrillated cellulose-polyvinyl alcohol films with improved mechanical performance", RSC Advances (2014), pp. 11343-11350, vol. 4, The Royal Society of Chemistry.

(Continued)

*Primary Examiner* — Edward Johnson
(74) *Attorney, Agent, or Firm* — Laura L. Bozek

(57) ABSTRACT

A multi-ply absorbent sheet includes a first absorbent ply of cellulosic sheet; a second absorbent ply of cellulosic sheet; and a ply bonding adhesive interposed between the first absorbent ply and the second absorbent ply, the ply-bonding adhesive thereby adhering said absorbent plies together. The ply-bonding adhesive comprises polyvinyl alcohol and nanofibrillated cellulose. In a particularly preferred embodiment the adhesive is applied as a dilute aqueous composition to tissue plies and the nanofibrillated cellulose has a Characteristic Breaking Length of 6.5 km or above.

20 Claims, 26 Drawing Sheets

(56) References Cited

U.S. PATENT DOCUMENTS

| | | |
|---|---|---|
| 2011/0052881 A1 | 3/2011 | Netravali et al. |
| 2011/0263756 A1 | 10/2011 | Yano et al. |
| 2011/0277947 A1 | 11/2011 | Hua et al. |
| 2012/0058536 A1 | 3/2012 | Ruda et al. |
| 2012/0219816 A1 | 8/2012 | Heiskanen et al. |
| 2014/0083634 A1 | 3/2014 | Bjoerkqvist et al. |
| 2014/0154756 A1 | 6/2014 | Nelson et al. |
| 2014/0284407 A1 | 9/2014 | Tamper et al. |
| 2015/0090156 A1 | 4/2015 | Combs et al. |
| 2015/0167243 A1 | 6/2015 | Bilodeau et al. |
| 2015/0368368 A1 | 12/2015 | Retsina et al. |
| 2017/0204304 A1 | 7/2017 | Yu et al. |
| 2017/0204567 A1 | 7/2017 | Yu et al. |

FOREIGN PATENT DOCUMENTS

| | | |
|---|---|---|
| JP | S60250079 A | 12/1985 |
| WO | 2006071147 A1 | 7/2006 |
| WO | 2010066905 A1 | 6/2010 |
| WO | 2011089053 A1 | 7/2011 |
| WO | 2014085729 A1 | 6/2014 |

OTHER PUBLICATIONS

Written Opinion dated Nov. 14, 2016.
Written Opinion dated Mar. 30, 2017 (PCT/US2017/013691; Corresponding to U.S. Appl. No. 15/405,397).
Written Opinion dated Mar. 30, 2017 (PCT/US2017/013693; Corresponding to U.S. Appl. No. 15/405,795).
International Search Report dated Mar. 30, 2017 (PCT/US2017/013691; Corresponding to U.S. Appl. No. 15/405,397).
International Search Report mailed Mar. 30, 2017 (PCT/US2017/013693; Corresponding to U.S. Appl. No. 15/405,795).
International Search Report and Written Opinion dated Feb. 26, 2016.
International Preliminary Report on Patentability dated May 10, 2017.
International Preliminary Report on Patentability (U.S. Appl. No. 15/405,397) dated Jan. 29, 2018.
International Preliminary Report on Patentability (U.S. Appl. No. 15/405,795) dated Jan. 28, 2018.

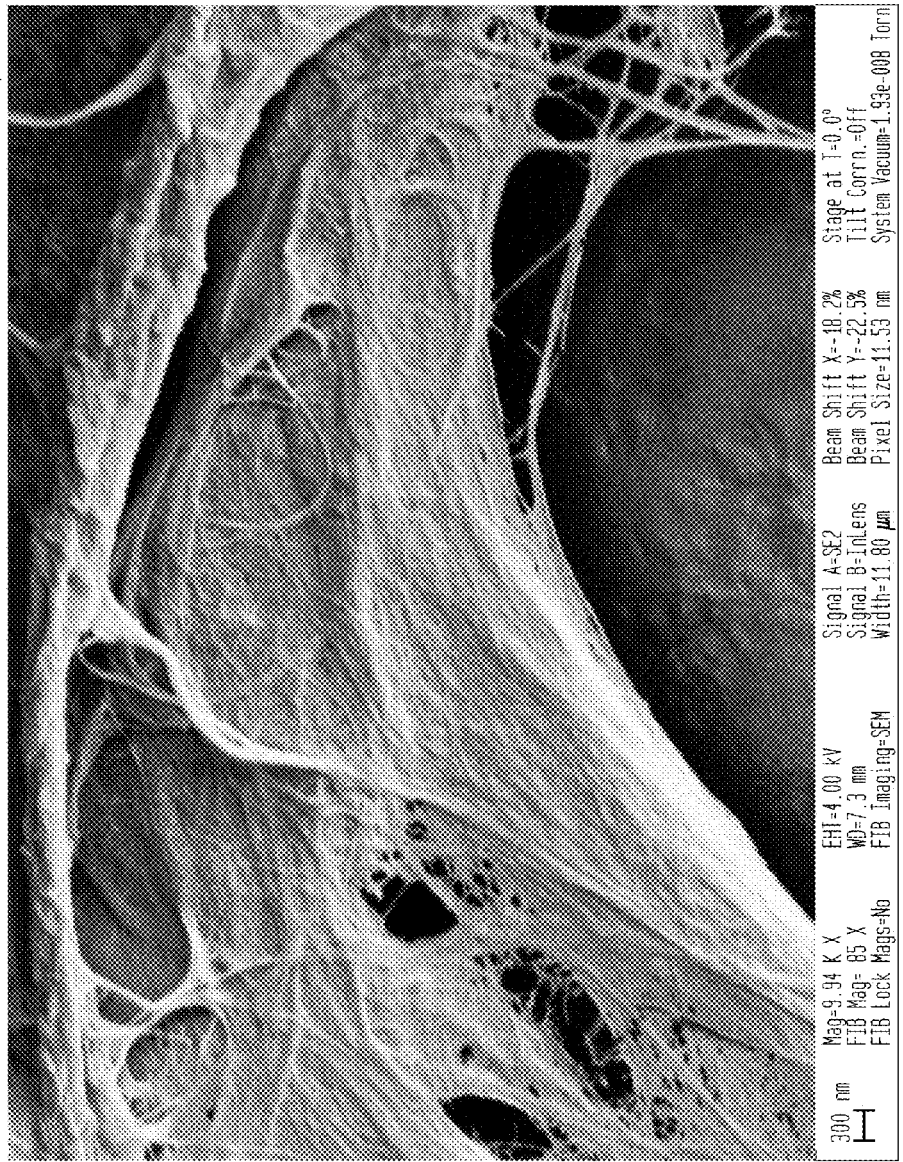

GLUE-BONDED MULTI-PLY ABSORBENT SHEET AND POLYVINYL ALCOHOL PLY BONDING ADHESIVE

CLAIM FOR PRIORITY

This application is a divisional application based on co-pending U.S. patent application Ser. No. 15/000,071 filed 19 Jan. 2016. U.S. patent application Ser. No. 15/000,071 was based on U.S. Provisional Application No. 62/108,594, filed Jan. 28, 2015. The priorities of the foregoing applications are hereby claimed and their disclosures incorporated herein by reference.

TECHNICAL FIELD

The present invention relates generally to glue-bonded, multi-ply absorbent sheet. The present invention is directed, in part, to multi-ply tissue wherein the plies are bonded to one another with a pseudoplastic polyvinyl alcohol adhesive containing nanofibrillated cellulose. The invention also extends to a method of making the sheet as well as the adhesive.

BACKGROUND

Multi-ply absorbent sheet such as towel and tissue sometimes conventionally include a plurality of glue-bonded layers or plies. Adhesives employed include aqueous polyvinyl alcohol (PVOH) solutions as is disclosed in U.S. Pat. No. 3,414,459. Such solutions are relatively low solids, less than 10% by weight PVOH and exhibit Newtonian Fluid viscosity characteristics; that is, wherein viscosity is substantially independent of shear. Tissue/towel ply bonding is typically carried out in the following steps: 1) embossing one or more plies; 2) applying glue to the web on the raised emboss pattern elements; 3) bringing one or more plies into contact with the glued surface and applying sufficient pressure to the mated web to provide enduring plybond once the glue has dried. This process places several demands on the glue. It must penetrate the first web, but not too much. Enough tackiness must remain to stick to the nonglued web. The remaining glue must preferably penetrate the nonglued web to improve the integrity of the bond. See, also, U.S. Pat. No. 5,858,554 to Neal et al., entitled Paper Product Comprising Adhesively Joined Plies which describes ply-bonded absorbent sheet provided with polyvinyl alcohol or starch adhesive compositions, note Col. 4, lines 20-55.

A paper/glue bond can be considered a fiber/polymer composite structure with a tendency to fracture at the interface of the plies. The process and product requirements present a difficult balancing act. If the glue is too viscous, it may not penetrate either ply sufficiently. If the glue is too thin, excess glue is required to overcome the excess wicking of glue into the web. Sometimes increased marrying roll pressure is used in an attempt to overcome the performance of the glue; however, bulk, softness and emboss quality suffer when too much pressure is used.

There is a need for a better ply bonding adhesive that overcomes the mentioned deficiencies.

Nanofibrillated cellulose (NFC) or sometimes referred to as microfibrillated cellulose (MFC) is known in the art to be useful for a variety of purposes, including for use as a structural material in sheet and related articles. For example, in U.S. Pat. No. 6,734,335 it is mentioned that NFC is useful for use in absorbent structures. Col. 22, lines 13+. See, also, U.S. Pat. No. 7,614,110, Col. 13, lines 38+. United States Patent Application Publication No. US 2012/0219816 discloses use of NFC as a layer in a multilayer paperboard structure, Abstract. See, generally, United States Patent Application Publication No. US 2012/0058536, ¶ [0151], which discloses NFC as a structural material. NFC is used in molded structures, as seen in United States Patent Application Publication No. US 2009/0308552, ¶ [0001], as well as United States Patent Application Publication No. US 2011/0263756, Abstract. NFC is, likewise, known for use in adhesives. JP 60250079 discloses a liquid adhesive made by blending a polyvinyl acetate emulsion, sodium carboxymethyl cellulose and above 3-4% NFC based on the weight of the liquid composition. See, also, United States Patent Application Publication No. US 2010/0285295, ¶ [0023], where NFC is mentioned as a filler for an adhesive resin; United States Patent Application Publication No. US 2011/0052881, ¶ [0062], having similar discussion, as well as United States Patent Application Publication No. US 2009/0042003, ¶ [0057].

SUMMARY OF INVENTION

Nanofibrillated cellulose has been found useful as a glue additive that results in an unexpectedly better fiber/polymer matrix by reinforcing the interface between the plies, providing for softer products with less glue. The NFC modifies the glue viscosity while strengthening the interface. NFC is a shear-thinning material, so it flows more as shear is applied, and recovers viscosity as shear decreases; that is, a stationary film of glue with NFC will be initially more viscous as it sits on the web surface and thin as the plies are married to enable penetration into each paper web. The glue will thicken after marrying to retain the wet bond with less pressure. NFC has the additional benefit that it can reinforce the interface between plies after drying.

Advantages of the invention are appreciated with references to FIGS. 1 and 2. FIG. 1 is a plot of trained panel softness (arbitrary scale) versus plybond for two-ply conventional wet press (CWP) tissue with the emboss pattern shown in FIG. 4. The invention sheet had 18.7 panel softness when a glue containing nanofibrillated cellulose (NFC) was used to laminate the plies with converting speeds at industrial speeds of 1000, 1500 and 2000 fpm (FIG. 1). The same basesheet, laminated with the control glue, was converted to 18.2 softness as described hereinafter.

FIG. 2 is a plot of Peel Test Plybond of TAD towel basesheet adhered with glues of the invention and control glues having the same composition without NFC. It is appreciated from FIG. 2 that glues of the invention provide increases in bonding strength, enabling lower glue add-ons for providing unexpectedly softer products at comparable levels of adhesion.

Still further features and advantages of the invention will become apparent from the discussion which follows.

BRIEF DESCRIPTION OF DRAWINGS

The invention is described in detail below with reference to the drawings wherein like numerals designate similar parts and wherein:

FIG. 13 is a scanning electron microscope image of NFC;

DETAILED DESCRIPTION

Figure 1:
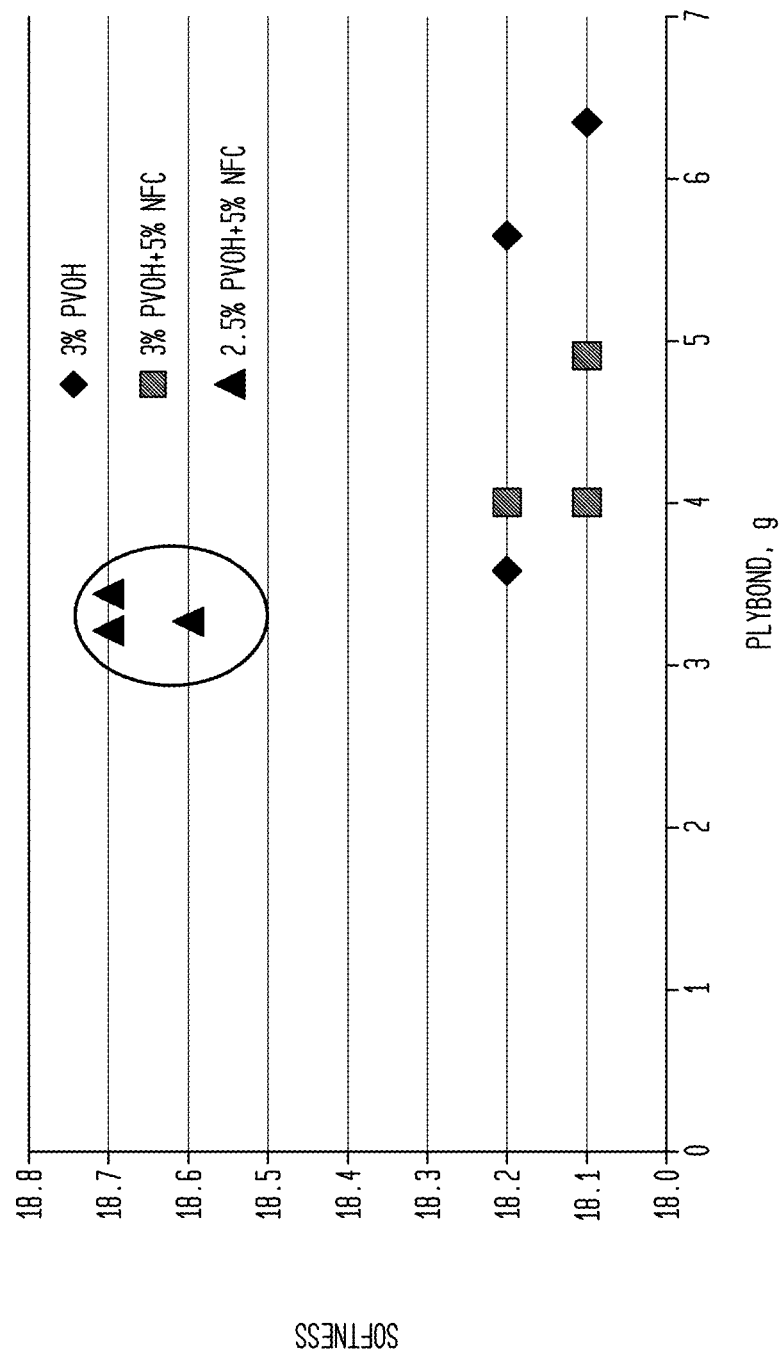
FIG. 1 is a plot of panel softness versus plybond for CWP tissue.

The invention is described in detail below in connection with the Figures for purposes of illustration, only. The invention is defined in the appended claims. Terminology used herein is given its ordinary meaning consistent with the exemplary definitions set forth immediately below; mg refers to milligrams and m² refers to square meters, fpm refers to feet per minute and so forth.

Adhesive Viscosity is measured at room temperature using a cone and plate geometry.

Characteristic Breaking Length of NFC material is determined by testing a strip cut from a handsheet of the subject NFC fiber as described herein.

Characteristic Nanofiber Viscosity is measured on a 1 wt % suspension of the NFC in water as further described herein.

Characteristic PVOH Viscosity is measured on a 4 wt % solution of the polyvinyl alcohol in water at a temperature of 20° C.

Relative Peel Test Plybond value refers to the ratio of the Peel Test Plybond of an NFC containing glue to that of the same glue without NFC×100%. The glues are tested with the same absorbent sheet by the same equipment and procedure and have the same composition except that one glue has no NFC. Thus, an NFC glue having 4.5% PVOH and 5% NFC having a Peel Test Plybond value of 50 g as compared with a PVOH glue of 4.5% PVOH having a Peel Test Plybond value of 20 g has a Relative Peel Test Plybond value of 50/20×100% or 250%.

A Relative Plybond value is the ratio of the Plybond of a product made with NFC/PVOH adhesive to that of an identical product made without NFC×100%. That is, the products are identical in composition, processing and the same Plybond measurement is made on the product. Thus, a product made with 5% NFC in the glue having a Plybond of 5 g as compared with an identical product made without NFC in the glue having a Plybond value of 4 g has a Relative Plybond value of 5/4×100% or 125%.

Cellulosic Sheet and Related Terminology

The term "cellulosic", "cellulosic sheet" and the like are meant to include any product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as *eucalyptus*, maple, birch, aspen, or the like. Papermaking fibers used in connection with the invention are typically naturally occurring pulp-derived fibers (as opposed to reconstituted fibers such as lyocell or rayon) which are liberated from their source material by any one of a number of pulping processes familiar to one experienced in the art including sulfate, sulfite, polysulfide, soda pulping, etc.

The pulp can be bleached if desired by chemical means including the use of chlorine dioxide, oxygen, alkaline peroxide and so forth. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including papermaking fibers, optionally wet strength resins, debonders and the like for making paper products.

Kraft softwood fiber is low yield fiber made by the well known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., *eucalyptus* and also has generally a lignin content of less than 5 percent by weight. Kraft hardwood fibers are shorter than softwood fibers, typically having a length weighted average fiber length of less than 1 mm and an arithmetic average length of less than 0.5 mm or less than 0.4 mm.

Recycle fiber may be added to the papermaking furnish in any amount. While any suitable recycle fiber may be used, recycle fiber with relatively low levels of ground wood is preferred in many cases, for example recycle fiber with less than 15% by weight lignin content, or less than 10% by weight lignin content may be preferred depending on the furnish mixture employed and the application. Recycle fiber is in many cases 80% hardwood fiber.

"Basesheet" refers to a unitary cellulosic sheet as manufactured by a paper machine. Basesheets may be layered; however, they have a unitary structure not readily delaminated. A "ply" of a finished product refers to basesheet incorporated into the product.

Products of the invention are made with a cellulosic fiber basesheet and have an absorbency or SAT value as well as tensiles and densities suitable for tissue and towel products. Typical SAT values are greater than about 3 g/g in most cases. See U.S. Pat. No. 8,778,138.

"CWP" refers to absorbent products made by a conventional wet-press process; that is, wet-pressing a furnish to a drying cylinder with a papermaking felt followed by creping the web from the cylinder. See U.S. Pat. No. 7,951,266, FIG. 7 thereof.

"Structured" basesheet refers to product that is wet creped (fabric creped) from a cylinder prior to final drying. See U.S. Pat. Nos. 7,850,823; 7,585,388; 7,585,389; and 7,662,257.

"TAD" refers to through-air dried absorbent products. Throughdried, creped products are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer.

The absorbent characteristics of a product can be affected by the furnish, basis weight, strength, papermaking technology, and so forth. The sheet absorbency and converting technology for a specific product will impact the selection of glue characteristics. CWP sheets are more consolidated than TAD sheets and therefore may have a lower wicking rate. Towel sheets commonly contain more softwood than tissue sheets, which may impact the pore size distribution of the web. It can be appreciated that an optimal glue formula for one product may not be optimal for another.

A towel product is typically characterized by having predominantly (more than 50% by weight based on fiber content) softwood fiber.

A tissue product is typically characterized by having predominantly (more than 50% by weight based on fiber content) hardwood fiber.

Laminating glue is commonly described in terms of PVOH solids. 3% PVOH glue should be understood as 3 grams of PVOH per 100 grams solution. The NFC addition is described in most cases as a percentage of the PVOH in the formula. Thus, "3% PVOH+5% NFC" means that the glue has 3 grams PVOH and 3*0.05=0.15 g NFC per 100 grams solution. In some cases, notably Embodiments 108 and following, NFC content is expressed as a weight percentage of the aqueous composition.

Embossing and Laminating Multi-Ply Absorbent Sheet

Figure 3:
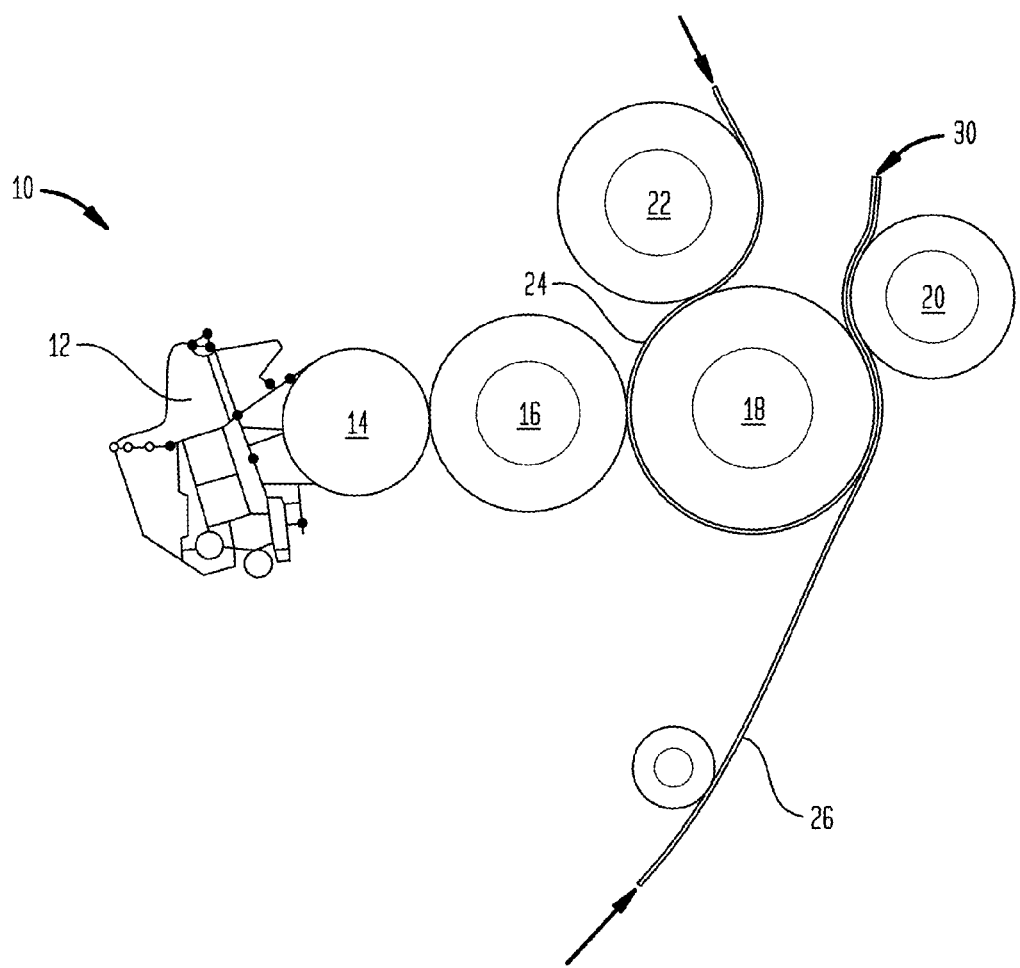
FIG. 3 is a schematic diagram of an embossing and laminating apparatus for preparing multi-ply absorbent sheet.

Referring to FIG. 3, there is shown a converting apparatus 10 for embossing and plying basesheet into a multi-ply product. Apparatus 10 includes a glue chamber 12 an anilox roll 14, an applicator roll 16, an embossing roll 18, a marrying roll 20 and an upper rubber roll 22 which is softer than marrying roll 20 which is made of hard rubber.

Figure 4:
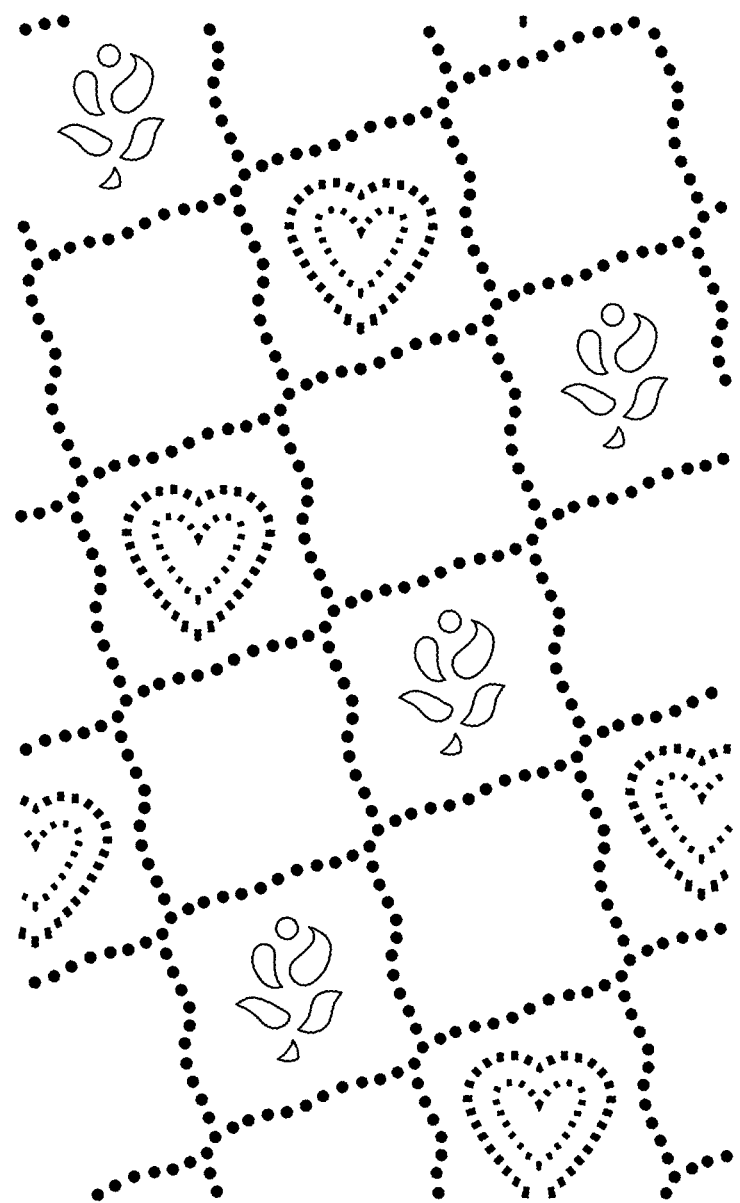
FIG. 4 is a diagram showing the pattern of raised embossments provided to the tissue basesheet by the apparatus of FIG. 3.

In operation, a first basesheet 24 is fed to the nip between upper roll 22 and embossing roll 18 where sheet 24 is provided with a plurality of raised embossments having the pattern shown in FIG. 4. The pattern of FIG. 4 provides an embossed area of raised embossments of 5.2% of the sheet area, which corresponds to the bonding area as will be appreciated from the discussion which follows. Glue, including the PVOH/NFC adhesives of this invention is provided as an aqueous composition to glue chamber 12 and is picked up by anilox roll 14 and transferred to applicator roll 16. From applicator roll 16, the glue is applied to the raised embossments of basesheet 24.

Concurrently with processing basesheet 24, a second basesheet 26 is fed through the nip defined by marrying roll 20 and embossing roll 18 such that basesheet 26 is pressed to basesheet 24, including the adhesive disposed on the raised embossments on basesheet 24, to produce multi-ply web 30.

Apparatus 10 was operated as described above to produce a variety of multi-ply tissue products, including the products described in FIG. 1. The apparatus was operated at converting speeds of 1000 fpm, 1500 fpm and 2000 fpm with basesheet of the type described in Table 1 which was prepared by a CWP process using tissue fiber furnish (75% slush southern HW/25% slush southern SW). Details as to tissue products made from these basesheets appear in Table 2.

TABLE 1

Physical Properties of CWP Base Web

| Description | Basis Weight, lb/3000 ft$^2$ | Caliper 8 sheet, Mils/8 sht | MD Tensile, g/3 in | CD Tensile, g/3 in | GM Tensile, g/3 in | MD Stretch, % | CD Stretch, % | MD T.E.A., mm-g/mm$^2$ | GM Break Modulus, g/% | CD T.E.A., mm-g/mm$^2$ | CD Break Modulus, g/% | Break Modulus MD g/% | Basis Weight Raw Wt, g |
|---|---|---|---|---|---|---|---|---|---|---|---|---|---|
| Basesheet 1 | 15.7 | 48.8 | 506 | 232 | 342 | 29.3 | 7.8 | 1.0 | 22.1 | 0.1 | 28.9 | 17.0 | 1.2 |
| Basesheet 2 | 15.7 | 46.8 | 555 | 258 | 378 | 29.4 | 8.2 | 1.1 | 24.4 | 0.2 | 31.6 | 18.9 | 1.2 |

TABLE 2

Physical Properties of Converted CWP Samples

| Sample | Glue | Converting speed, fpm | Basis Weight lb/3000 ft^2 | Caliper 8 Sheet mils/ 8 sht | Tensile MD g/3 in | Tensile CD g/3 in | Tensile GM g/3 in | Stretch MD % | Stretch CD % |
|---|---|---|---|---|---|---|---|---|---|
| a1 | 3% PVOH | 1000 | 31.86 | 121.38 | 1,008.51 | 489.07 | 701.67 | 28.08 | 8.82 |
|    |         | 1500 | 32.04 | 122.83 | 960.07 | 500.75 | 693.10 | 27.11 | 9.05 |
|    |         | 2000 | 32.03 | 120.71 | 935.43 | 468.76 | 661.62 | 27.79 | 9.11 |
| a2 | 3% PVOH + | 1000 | 32.24 | 120.41 | 999.99 | 496.06 | 703.82 | 28.76 | 9.01 |
|    | 5% NFC III | 1500 | 32.33 | 119.95 | 965.75 | 518.94 | 707.70 | 28.18 | 9.03 |
|    |            | 2000 | 32.07 | 120.56 | 956.24 | 487.08 | 682.03 | 28.05 | 8.95 |
| a3 | 2.5% PVOH + | 1000 | 32.39 | 120.83 | 1,013.03 | 512.50 | 720.25 | 29.20 | 8.82 |
|    | 5% NFC III  | 1500 | 32.06 | 119.91 | 940.26 | 502.39 | 687.02 | 27.82 | 9.10 |
|    |             | 2000 | 32.10 | 120.17 | 948.41 | 486.86 | 679.13 | 28.21 | 9.67 |

| Sample | Glue | Converting speed, fpm | Wet Tens Finch CD g/3 in | Break Modulus GM g/% | Brtness MacBeth UV-C % | Color MacBeth b*-UV C Unitless | Opacity MacBeth Opacity Units |
|---|---|---|---|---|---|---|---|
| a1 | 3% PVOH | 1000 | 64.27 | 44.53 | 83.12 | 6.12 | 72.99 |
|    |         | 1500 | 63.89 | 44.36 | 83.44 | 6.06 | 73.62 |
|    |         | 2000 | 59.56 | 41.20 | 83.51 | 5.98 | 73.09 |
| a2 | 3% PVOH + | 1000 | 63.08 | 43.55 | 83.29 | 6.15 | 73.89 |
|    | 5% NFC III | 1500 | 64.46 | 43.93 | 83.39 | 6.07 | 73.70 |
|    |            | 2000 | 62.14 | 43.20 | 83.38 | 6.06 | 73.71 |
| a3 | 2.5% PVOH + | 1000 | 65.13 | 44.79 | 83.60 | 6.00 | 73.45 |
|    | 5% NFC III  | 1500 | 63.56 | 42.70 | 83.45 | 6.04 | 73.76 |
|    |             | 2000 | 60.45 | 41.12 | 83.65 | 5.98 | 73.73 |

| Sample | Glue | Converting speed, fpm | TMI Plybond g | Roll Diameter in | Roll Compress Value % | Break Modulus MD g/% | Break Modulus CD g/% | Color MacBeth a*-UV CUnitless | Color MacBeth L*-UV CUnitless |
|---|---|---|---|---|---|---|---|---|---|
| a1 | 3% PVOH | 1000 | 6.35 | 4.50 | 27.24 | 35.91 | 55.29 | −1.23 | 96.40 |
|    |         | 1500 | 5.65 | 4.54 | 29.13 | 35.53 | 55.43 | −1.25 | 96.50 |
|    |         | 2000 | 3.58 | 4.53 | 27.20 | 33.31 | 51.01 | −1.22 | 96.50 |
| a2 | 3% PVOH + | 1000 | 4.91 | 4.57 | 28.47 | 34.65 | 54.78 | −1.24 | 96.50 |
|    | 5% NFC III | 1500 | 4.01 | 4.57 | 28.52 | 33.76 | 57.19 | −1.25 | 96.50 |
|    |            | 2000 | 4.01 | 4.57 | 28.87 | 34.26 | 54.50 | −1.23 | 96.49 |
| a3 | 2.5% PVOH + | 1000 | 3.27 | 4.55 | 28.33 | 34.36 | 58.43 | −1.24 | 96.55 |
|    | 5% NFC III  | 1500 | 3.44 | 4.57 | 29.93 | 33.71 | 54.14 | −1.25 | 96.50 |
|    |             | 2000 | 3.21 | 4.58 | 29.55 | 33.33 | 50.78 | −1.21 | 96.56 |

| Sample | Glue | Converting speed, fpm | T.E.A. MD mm-g/ mm^2 | T.E.A. CD mm-g/ mm^2 | Basis Weight Raw Wtg | Roll Comp in | Softness |
|---|---|---|---|---|---|---|---|
| a1 | 3% PVOH | 1000 | 1.98 | 0.32 | 2.41 | 3.28 | 18.1 |
|    |         | 1500 | 1.85 | 0.34 | 2.42 | 3.22 | 18.2 |
|    |         | 2000 | 1.86 | 0.32 | 2.42 | 3.30 | 18.2 |
| a2 | 3% PVOH + | 1000 | 2.01 | 0.34 | 2.44 | 3.27 | 18.1 |
|    | 5% NFC III | 1500 | 1.91 | 0.36 | 2.44 | 3.27 | 18.2 |
|    |            | 2000 | 1.88 | 0.33 | 2.42 | 3.25 | 18.2 |
| a3 | 2.5% PVOH + | 1000 | 2.03 | 0.34 | 2.45 | 3.26 | 18.6 |
|    | 5% NFC III  | 1500 | 1.85 | 0.35 | 2.42 | 3.20 | 18.7 |
|    |             | 2000 | 1.88 | 0.36 | 2.43 | 3.23 | 18.7 |

Figure 5:
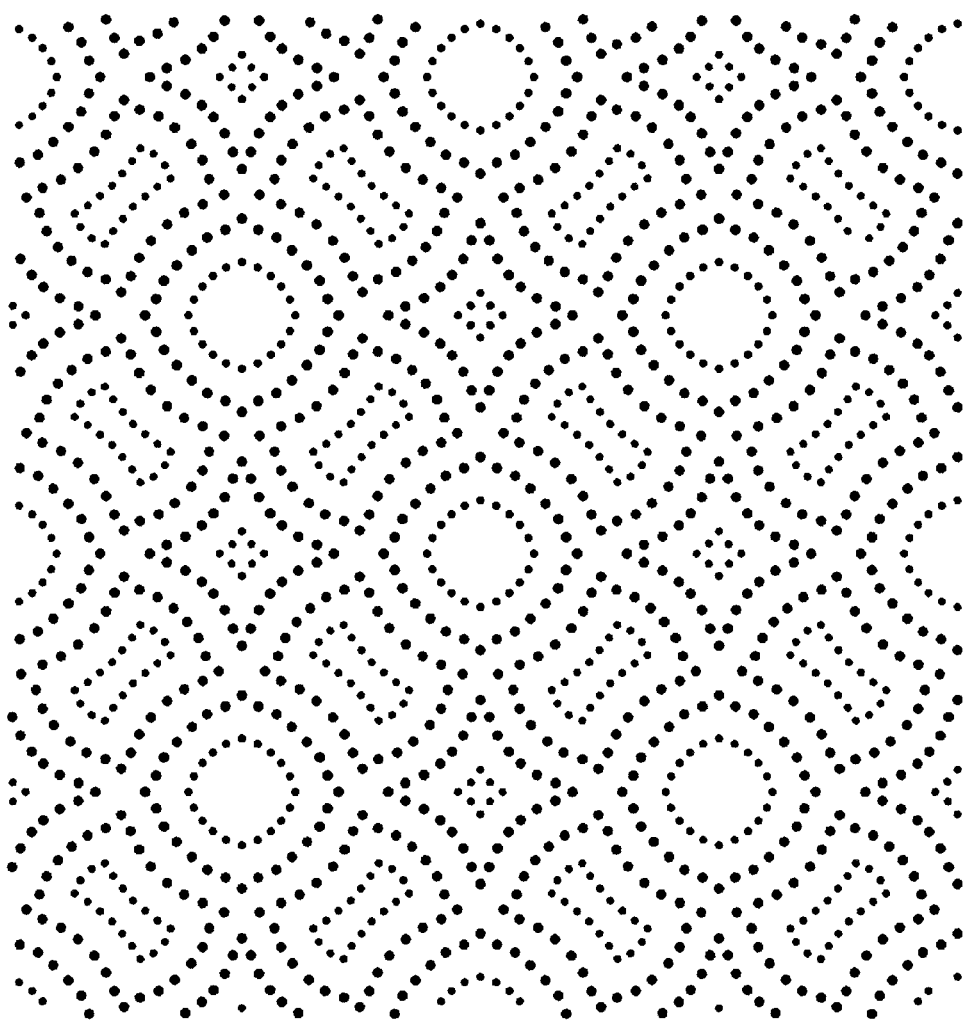
FIG. 5 is a diagram showing the pattern of raised embossments provided to a towel basesheet by the apparatus of FIG. 3.

A series of towel products were prepared using the apparatus of FIG. 3 using a towel basesheet (100% softwood Kraft fiber) prepared by a TAD process. The basesheet had the properties indicated in Table 3. The finished product was provided with the pattern of raised embossments shown in FIG. 5 and plied with the glue formulations shown in Table 4, which also provides property data on the two-ply towel.

TABLE 3

Physical Properties of TAD Towel Basesheet

| Basis Weight lb/3000 ft^2 | Caliper 8 Sheet mils/ 8 sht | Tensile MD g/3 in | Tensile CD g/3 in | Tensile GM g/3 in | Stretch MD % | Stretch CD % | Wet Tens Finch Cured CD g/3 in | T.E.A. MD mm · g/ mm^2 | Break Modulus GM g/% | T.E.A. CD mm · g/ mm^2 | Break Modulus CD g/% | Break Modulus MD g/% |
|---|---|---|---|---|---|---|---|---|---|---|---|---|
| 15.72 | 100.90 | 1242 | 1196 | 1218 | 13.6 | 7.1 | 342.32 | 1.133 | 123.23 | 0.569 | 167.71 | 90.57 |
| 15.40 | 101.75 | 1375 | 1240 | 1305 | 14.6 | 7.7 | 342.89 | 1.351 | 123.44 | 0.596 | 158.92 | 95.90 |

TABLE 4

Physical Properties of Converted TAD Paper Towels

| Actual Glue Sample | Basis Weight lb/3000 ft^2 | Caliper 8 Sheet mils/ 8 sht | Tensile MD g/3 in | Stretch MD % | Tensile CD g/3 in | Stretch CD % | Tensile GM g/3 in | Tensile Dry Ratio Unitless | Wet Tens Finch Cured CD g/3 in | Tensile Wet/Dry CD Unitles | SAT Capacity g/m^2 | SAT Rate g/s^0.5 |
|---|---|---|---|---|---|---|---|---|---|---|---|---|
| 5% PVOH | 31.2 | 214.2 | 2248 | 15.3 | 1951 | 8.0 | 2094 | 1.15 | 527 | 0.27 | 540 | 0.32 |
| 4.6% PVOH + 5% NFC | 31.2 | 213.4 | 2336 | 15.4 | 1994 | 8.2 | 2157 | 1.17 | 512 | 0.26 | 549 | 0.32 |
| 4.4% PVOH + 5% NFC | 31.1 | 213.9 | 2241 | 15.0 | 2027 | 8.1 | 2131 | 1.11 | 532 | 0.26 | 537 | 0.30 |
| 4% PVOH + 15% NFC | 31.2 | 215.0 | 2290 | 15.3 | 1964 | 8.1 | 2120 | 1.17 | 514 | 0.26 | 547 | 0.32 |
| 3.6% PVOH + 15% NFC | 31.4 | 214.8 | 2262 | 15.0 | 1998 | 8.3 | 2126 | 1.13 | 525 | 0.26 | 535 | 0.32 |
| 4.2% PVOH | 30.7 | 209.9 | 2392 | 14.7 | 2019 | 8.0 | 2197 | 1.18 | 535 | 0.27 | 538 | 0.28 |
| 4.2% PVOH + 10% NFC | 30.8 | 211.8 | 2186 | 14.6 | 1918 | 8.1 | 2047 | 1.14 | 517 | 0.27 | 546 | 0.32 |
| 3.9% PVOH | 31.3 | 213.1 | 2233 | 14.6 | 1931 | 7.8 | 2076 | 1.16 | 521 | 0.27 | 536 | 0.32 |
| 3.8% PVOH + 15% NFC | 30.9 | 212.3 | 2206 | 15.1 | 1866 | 7.9 | 2029 | 1.18 | 511 | 0.27 | 558 | 0.31 |
| 3.8% PVOH + 10% NFC | 30.7 | 211.9 | 2169 | 14.9 | 1917 | 8.1 | 2039 | 1.13 | 502 | 0.26 | 554 | 0.31 |

| Actual Glue Sample | SAT Time s | Break Modulus MD g/% | Break Modulus CD g/% | Break Modulus GM g/% | T.E.A. MD mm · g/ mm^2 | T.E.A. CD mm · g/ mm^2 | Roll Diameter in | Roll Compress Value % | Roll Comp in | Softness |
|---|---|---|---|---|---|---|---|---|---|---|
| 5% PVOH | 29.6 | 147 | 244 | 189 | 2.1 | 1.1 | 4.58 | 9.2 | 4.16 | 7.7 |
| 4.6% PVOH + 5% NFC | 27.2 | 152 | 240 | 191 | 2.2 | 1.1 | 4.58 | 9.3 | 4.15 | 8 |
| 4.4% PVOH + 5% NFC | 28.3 | 150 | 254 | 195 | 2.1 | 1.1 | 4.59 | 9.7 | 4.15 | 7.9 |
| 4% PVOH + 15% NFC | 26.2 | 150 | 244 | 191 | 2.2 | 1.1 | 4.60 | 9.8 | 4.15 | 7.6 |
| 3.6% PVOH + 15% NFC | 28.6 | 153 | 241 | 192 | 2.1 | 1.1 | 4.60 | 10.1 | 4.14 | 7.8 |
| 4.2% PVOH | 28.6 | 163 | 253 | 203 | 2.2 | 1.1 | 4.57 | 11.4 | 4.05 | 7.8 |
| 4.2% PVOH + 10% NFC | 26.8 | 150 | 236 | 188 | 2.0 | 1.0 | 4.57 | 10.3 | 4.10 | 7.8 |
| 3.9% PVOH | 25.7 | 154 | 249 | 196 | 2.0 | 1.0 | 4.60 | 10.7 | 4.11 | 7.6 |
| 3.8% PVOH + 15% NFC | 24.8 | 146 | 236 | 186 | 2.0 | 1.0 | 4.58 | 10.3 | 4.11 | 7.7 |
| 3.8% PVOH + 10% NFC | 25.1 | 147 | 238 | 187 | 2.0 | 1.1 | 4.59 | 10.2 | 4.12 | 7.6 |

Figure 6:
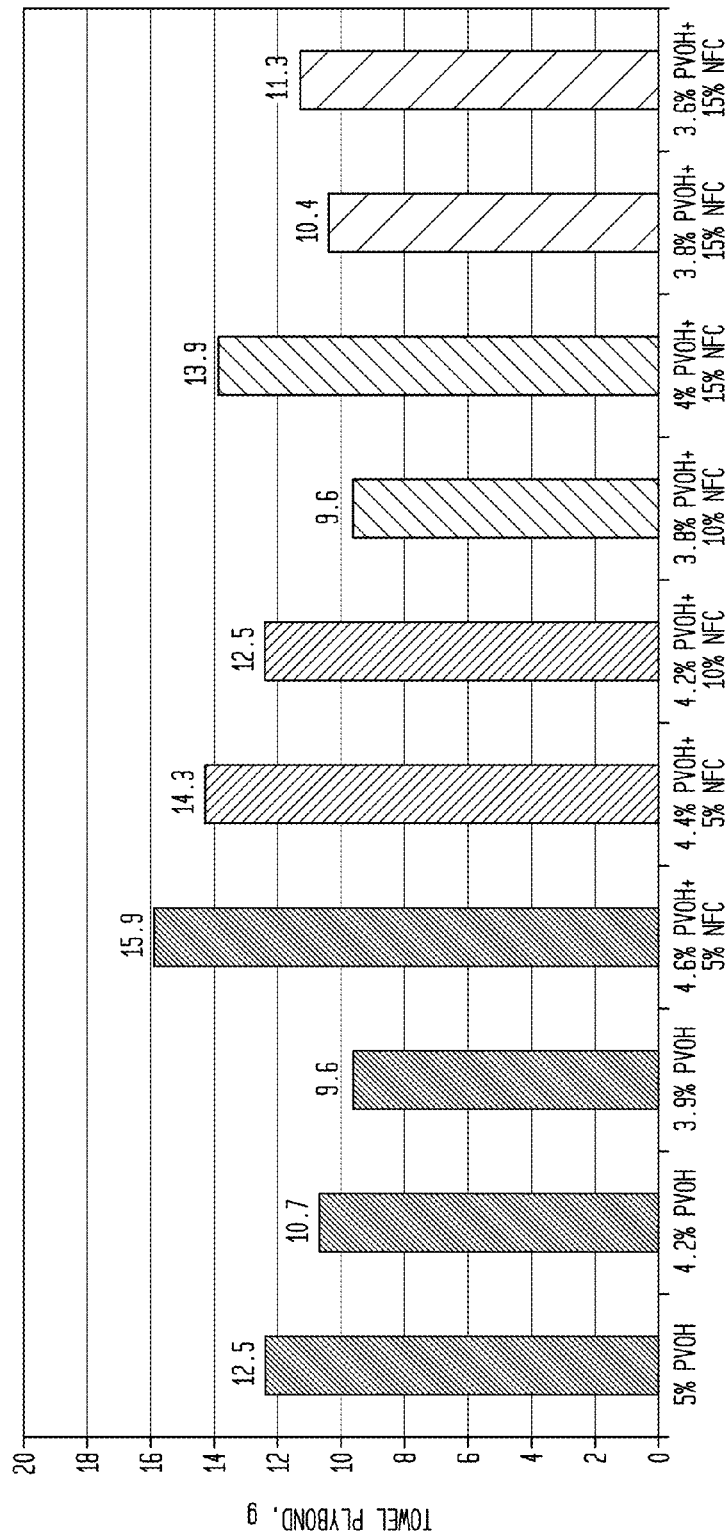
FIG. 6 is a histogram showing Plybond values for various two-ply TAD towels with different glues.
Figure 7:
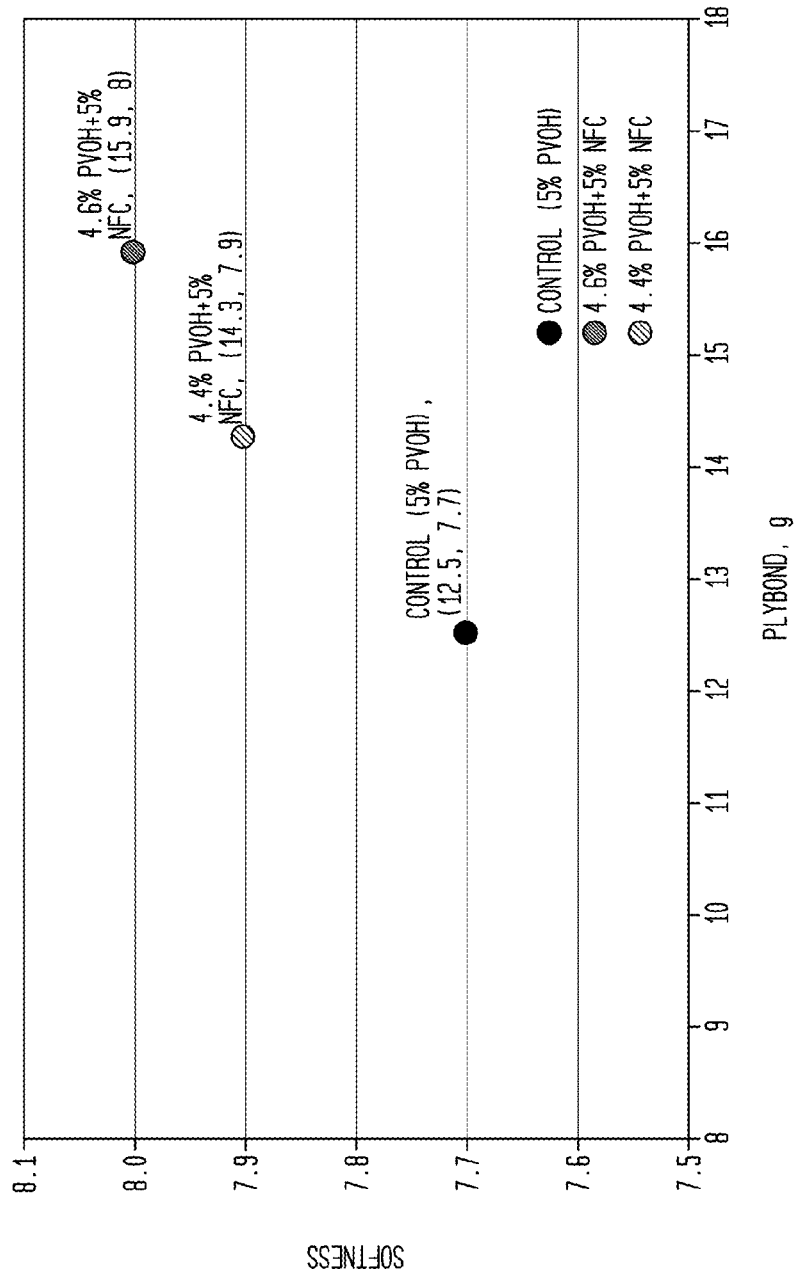
FIG. 7 is a plot of trained panel softness (arbitrary scale) versus Plybond for two-ply TAD towels laminated with different glues.
Figure 8:
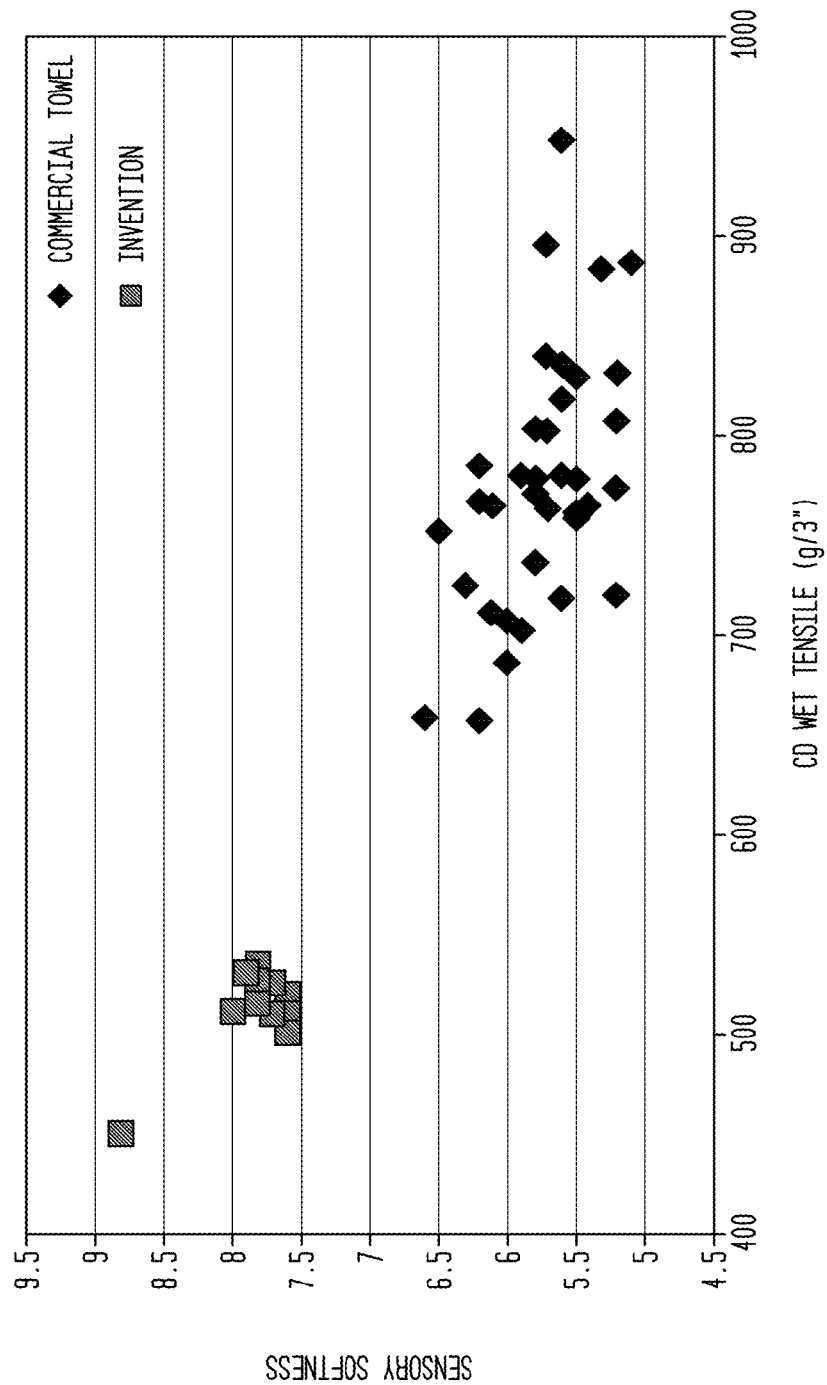
FIG. 8 is a plot of trained panel softness (arbitrary scale) versus CD Wet Tensile for commercial towel and towels of the invention.

It is appreciated from FIG. 6 that the NFC containing glues of the invention provided unexpected results in Plybond values to PVOH glues, making it possible to use less glue for a given Plybond. This latter feature is believed to provide better softness as is seen in FIGS. 7 and 8. In FIG. 7, it is seen that 4.6% and 4.4% POH glues with NFC provide better Plybond and better softness than the 5% PVOH control. In FIG. 8, it is seen the invention products have low CD Tensile values and higher softness values than corresponding conventional products. In general, Wet CD Tensile is believed inversely related to softness which is consistent with results seen in FIG. 8.

Apparatus 10 was also used to compare NFC containing PVOH adhesives with similar PVOH adhesives containing xanthan gums, described below.

Comparison with Xanthan Gum Glue Modifier

Figure 9:
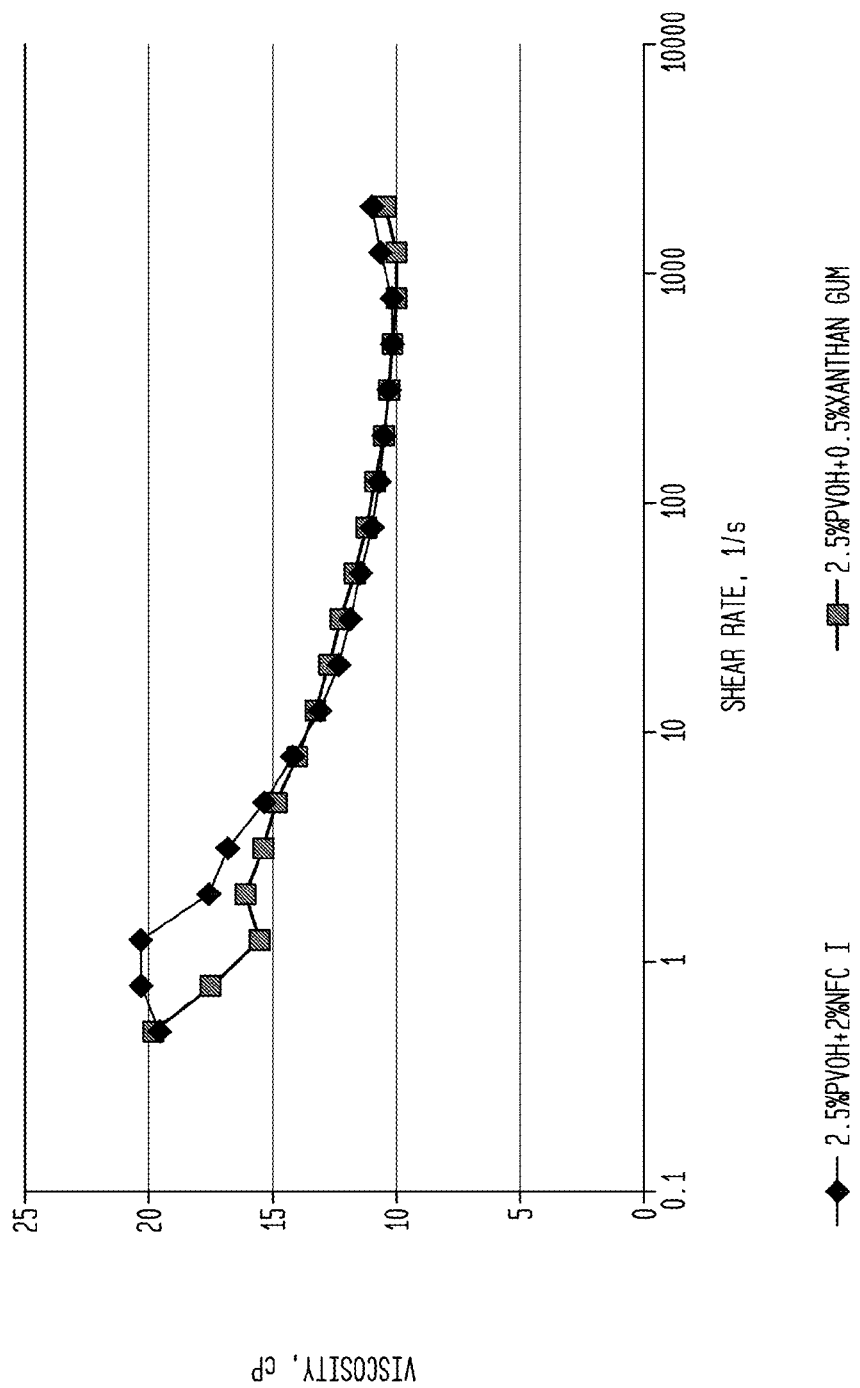
FIG. 9 is a plot of viscosity versus shear rate for PVOH/NFC adhesive and a PVOH/xanthan gum adhesive having a comparable viscosity profile.

For purposes of discerning whether the properties imparted by the inventive adhesive to multi-ply sheet were due to viscosity modification of PVOH alone or whether the NFC imparted additional benefits, PVOH adhesives with NFC and with Xanthan gum instead of NFC, were prepared as described above. These adhesives had the composition and viscosity profiles shown in FIG. 9.

These adhesives were used to produce two-ply, glue-bonded tissue as described generally in connection with the products described in Table 2 with two-ply CWP embossed tissue. Plybond results appear in FIG. 10.

The two-ply CWP bath tissue produced demonstrated that:

NFC provides a plybond reinforcement effect for two-ply CWP

The plybond improved by 77% and 25% at converting speed of 1500 fpm and 2000 fpm, respectively, with the addition of 2% NFC in 2.5% PVOH.

The improvement of plybond by NFC reinforced glue was not only due to viscosity.

These adhesives were also used to produce two-ply, glue-bonded tissue as described generally in connection with the products described in Table 5 with structured (fabric creped), embossed tissue. Plybond results appear in FIG. 11.

TABLE 5

Structured Two-Ply Tissue Properties

| two-ply structured Bath Tissue Description | Sample | Basis Weight lb/3000 ft^2 | Caliper 8 Sheet mils/ 8 sht | Tensile MD g/3 in | Tensile CD g/3 in | Tensile GM g/3 in | Stretch MD % | Stretch CD % | Wet Tens Finch CD g/3 in | Break Modulus GM g/% | TMI Plybond g |
|---|---|---|---|---|---|---|---|---|---|---|---|
| Structured | 43 | 26.7 | 124.1 | 963 | 630 | 779 | 17.5 | 7.8 | 79.1 | 66.9 | 2.5 |
| Structured | 44 | 26.9 | 125.5 | 931 | 622 | 760 | 17.2 | 7.9 | 76.6 | 65.5 | 2.1 |
| Structured | 45 | 26.7 | 125.5 | 938 | 599 | 749 | 17.0 | 7.7 | 79.1 | 65.5 | 1.8 |
| Structured | 46 | 27.0 | 125.7 | 940 | 597 | 748 | 16.4 | 7.9 | 77.1 | 66.3 | 1.0 |
| Structured | 47 | 26.7 | 125.3 | 886 | 577 | 714 | 15.9 | 7.6 | 74.9 | 65.7 | 0.8 |
| Structured | 48 | 27.1 | 126.0 | 891 | 605 | 734 | 15.3 | 7.4 | 77.4 | 69.5 | 0.7 |
| Structured | 49 | 26.8 | 125.3 | 922 | 603 | 745 | 15.3 | 7.4 | 77.6 | 70.3 | 1.6 |
| Structured | 52 | 27.5 | 124.3 | 967 | 657 | 796 | 17.1 | 7.5 | 81.7 | 70.8 | 1.8 |
| Structured | 53 | 27.4 | 124.7 | 954 | 645 | 784 | 17.9 | 7.5 | 79.1 | 68.1 | 1.5 |
| Structured | 55 | 27.1 | 124.7 | 931 | 615 | 756 | 17.5 | 7.5 | 77.5 | 65.9 | 1.3 |
| Structured | 56 | 27.1 | 125.0 | 947 | 612 | 761 | 17.2 | 7.5 | 76.6 | 67.5 | 1.1 |
| Structured | 57 | 27.2 | 123.9 | 934 | 585 | 739 | 17.6 | 7.3 | 74.5 | 66.1 | 0.9 |

| two-ply structured Bath Tissue Description | Roll Diameter in | Roll Compress Value % | Break Modulus MD g/% | Break Modulus CD g/% | T.E.A. MD mm-g/mm^2 | T.E.A. CD mm-g/mm^2 | Roll Comp in | Softness | Total solids, % |
|---|---|---|---|---|---|---|---|---|---|
| Structured | 4.3 | 18.3 | 55.0 | 81.4 | 1.2 | 0.3 | 3.5 | | |
| Structured | 4.3 | 19.8 | 53.9 | 79.6 | 1.1 | 0.3 | 3.4 | 19.10 | 3.00 |
| Structured | 4.3 | 21.4 | 54.9 | 78.3 | 1.1 | 0.3 | 3.4 | | |
| Structured | 4.3 | 21.3 | 57.1 | 77.1 | 1.1 | 0.3 | 3.4 | | |
| Structured | 4.3 | 22.3 | 56.0 | 77.3 | 1.0 | 0.3 | 3.3 | 19.10 | 2.50 |
| Structured | 4.2 | 22.3 | 58.5 | 82.5 | 1.0 | 0.3 | 3.3 | | |
| Structured | 4.3 | 23.1 | 60.5 | 81.8 | 1.0 | 0.3 | 3.3 | 19.30 | 2.00 |
| Structured | 4.2 | 20.6 | 57.4 | 87.4 | 1.2 | 0.3 | 3.4 | | |
| Structured | 4.2 | 23.5 | 53.4 | 87.0 | 1.2 | 0.3 | 3.2 | 19.10 | 2.55 |
| Structured | 4.3 | 19.7 | 53.8 | 80.8 | 1.2 | 0.3 | 3.4 | | |
| Structured | 4.3 | 22.7 | 56.1 | 81.2 | 1.2 | 0.3 | 3.3 | 19.30 | 2.51 |
| Structured | 4.3 | 22.3 | 54.0 | 80.9 | 1.2 | 0.3 | 3.3 | | |

The structured bath tissue demonstrated that:
- two-ply structured bath tissue had significantly lower plybond by using the same glue and same converting conditions as two-ply CWP.
- NFC shows plybond reinforcement effect for two-ply structured bath tissue. The plybond improved by 80% and 88% at converting speed of 1000 fpm and 1500 fpm, respectively, with the addition of 2% NFC in 2.5% PVOH.
- The improvement of plybond by NFC reinforced glue was not only due to viscosity.

Three-Ply Products

Figure 12A:
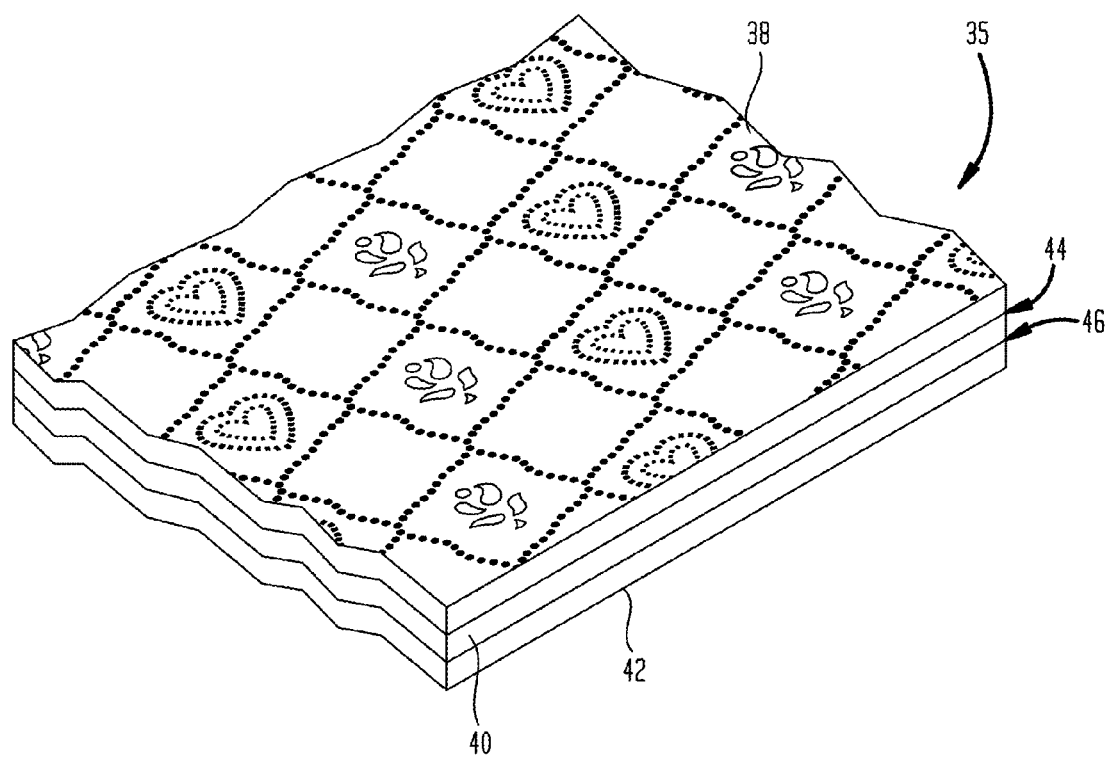
FIG. 12A is a perspective view of a three-ply product.

In some preferred embodiments, the present invention relates to three-ply products such as three-ply tissue products as shown in FIG. 12A. A three-ply product 35 includes a first outer ply 38, a central ply 40 and a second outer ply 42. The plies are adhered together by PVOH/NFC adhesive securing plies together at their interfaces indicated at 44, 46. Three-ply products may be made by successive lamination of the plies or by way of simultaneous lamination as is known in the art. Towel products may likewise be produced as three-ply absorbent structures, if so desired.

Figure 12B:
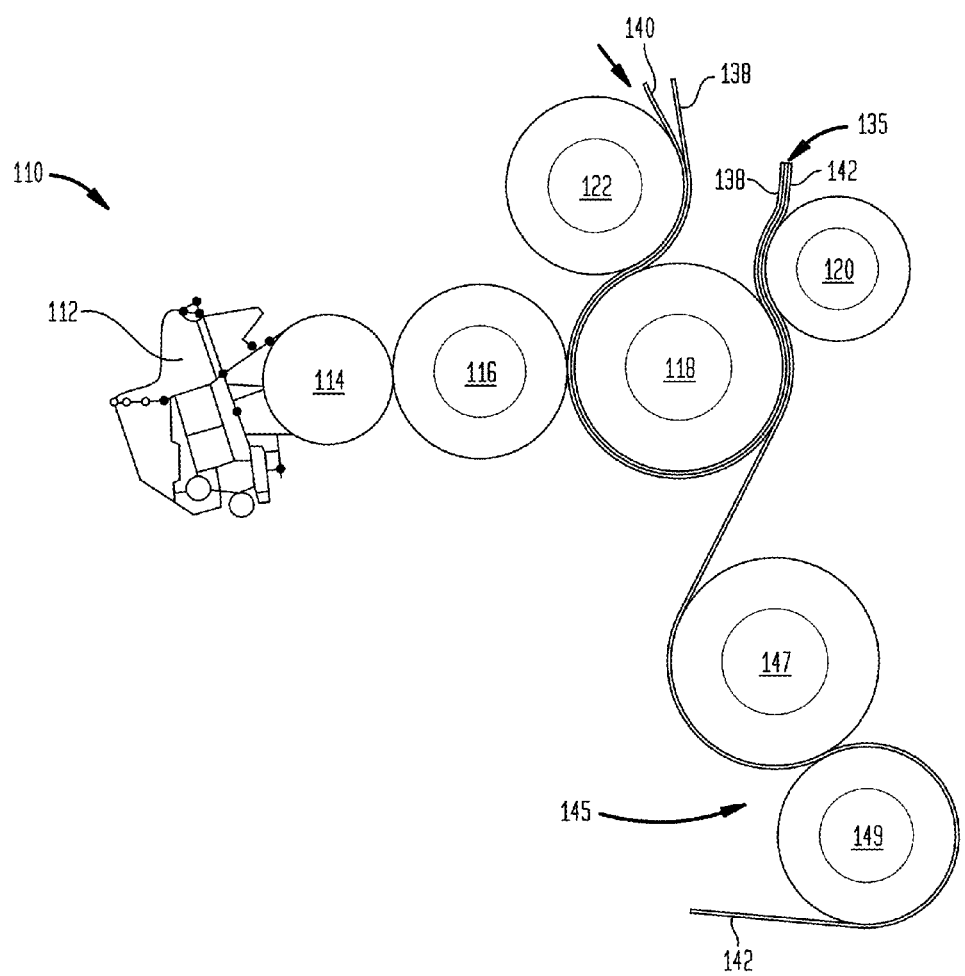
FIG. 12B is a schematic diagram showing an embossing and laminating process for preparing 3-ply absorbent sheet.

One preferred method of preparing 3-ply absorbent sheet is illustrated in connection with FIG. 12B, wherein there is shown a converting apparatus 110 for embossing and plying basesheet into a multi-ply product. Apparatus 110 includes a glue chamber 112 an anilox roll 114, an applicator roll 116, an embossing roll 118, a marrying roll 120 and an upper rubber roll 122 which is softer than marrying roll 120 which is made of hard rubber. A micro-embossing nip 145 including a micro-embossing roll 147 and a rubber roll 149 is provided for embossing a bottom sheet, as is noted below.

In operation, a top ply basesheet 138 and a middle ply basesheet 140 are fed to the nip between upper roll 122 and embossing roll 118 where the top ply (and to a lesser extent, ply 140) are provided with an emboss pattern. NFC/PVOH glue is provided as an aqueous composition to glue chamber 112, is picked up by anilox roll 114 and transferred to applicator roll 116. From applicator roll 116 the glue is applied to sheet 140.

Concurrently with processing layers 140, 138, a bottom ply basesheet 142 is fed to micro-embossing nip 145 where it is micro-embossed. Sheet 142 is advanced to the nip defined by marrying roll 120 and embossing roll 118 such that the layers are pressed together to produce 3-ply product 135.

Figure 12C:
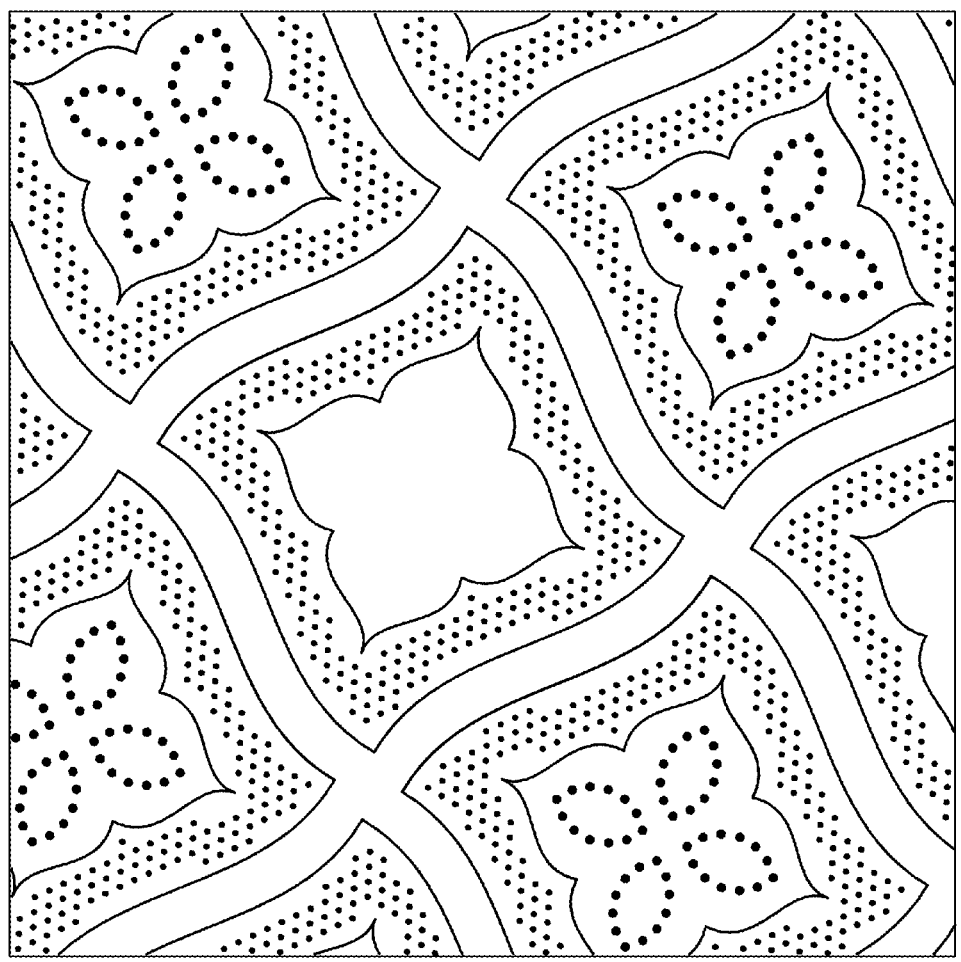
FIG. 12C is a diagram showing a pattern for a top sheet of a 3-ply absorbent sheet.

Using the procedures and materials generally described above, 3-ply tissue products were prepared by micro embossing the bottom ply and applying the ply bonding adhesive on the middle layer followed by pressing the middle and bottom plies together, as shown and described in connection with FIG. 12B. The development of the target plybond between the top and middle layer was due to the adhesive wicking through to middle layer facilitated by marrying roll pressing. Although PVOH/NFC glue had less and slower penetration into the sheet, due to the highly efficient reinforcement property of NFC, even a little PVOH/NFC glue might achieve the target plybond (2.2 g) between the top and middle layer. For a top sheet emboss pattern bordered by compressed lines as is seen in FIG. 12C, results appear in Table 6. The NFC glue resulted in a 0.2 sensory softness boost at the same GM tensiles and the same finished product ply bond of 2.2 g, when added to the PVOH glue when it was 4.1% solids. There was a 0.1 sensory softness boost when added to the PVOH glue when it was at 3.5% solids.

TABLE 6

3-Ply Softness, Plybond

| | Control glue 5% PVOH | NFC glue 1 4.1% PVOH + 5% NFC (4.3% total solids) | NFC glue 2 3.5% PVOH + 5% NFC 3.7% total solids) |
|---|---|---|---|
| Softness | 19.6 | 19.8 | 19.7 |
| Geometric mean tensile, g/3" | 594 | 598 | 629 |
| TMI plybond, g | 2.2 | 2.2 | 2.2 |

Figure 12D:
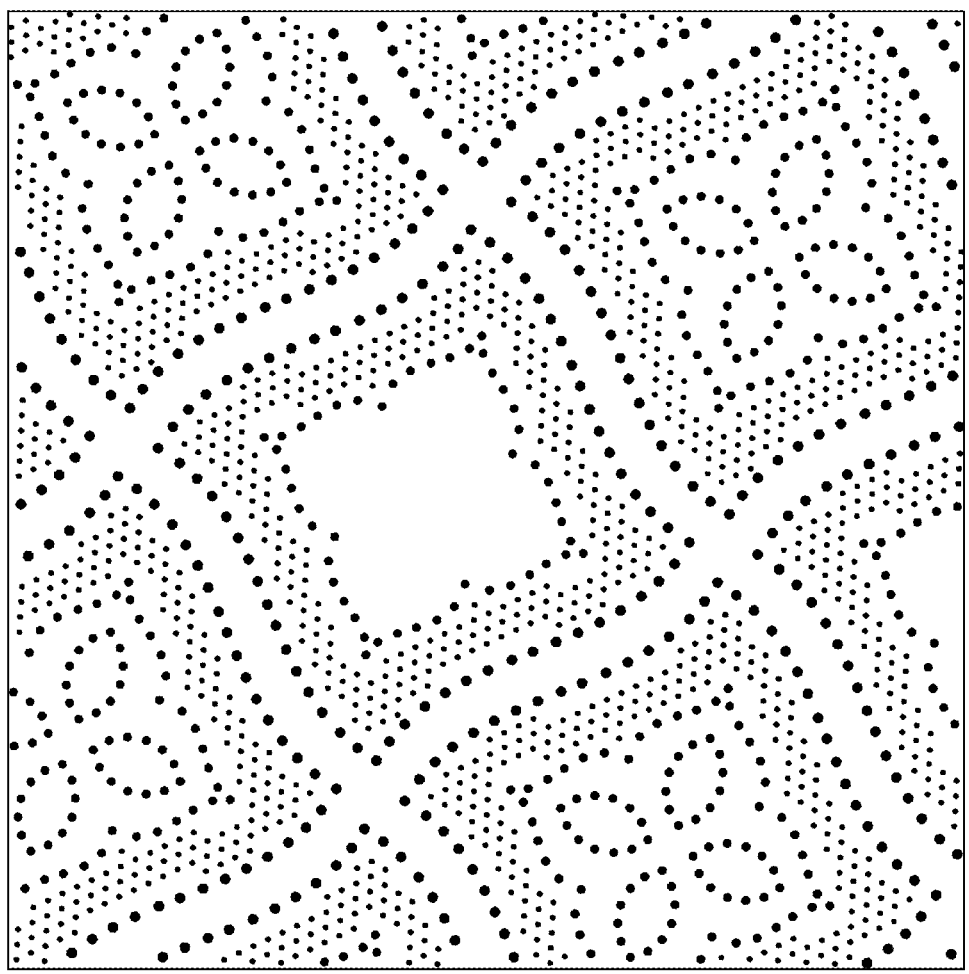
FIG. 12D is a diagram showing a pattern for a top sheet of another 3-ply absorbent sheet.

Using a slightly different top sheet emboss pattern, bordered by dotted lines as is seen in FIG. 12D, the NFC boosted glue yielded the same sensory softness as ply bond glue. Results appear in Table 7. Note that the plybond was significantly higher for the NFC prototype. Due to the increased geometric mean tensile of the finished product listed in Table 7, and possibly the differences in the emboss patterns, the overall sensory softness for both of these prototypes was significantly lower than for the sensory softness for the prototypes made in Table 6.

TABLE 7

3-Ply Softness, Plybond

| | Control PVOH glue (5% total solids) | 5% PVOH glue with 5% NFC (5.25% total solids) |
|---|---|---|
| Softness | 19.2 | 19.2 |
| Geometric mean tensile, g/3" | 758 | 789 |
| TMI plybond, g | 1.6 | 6.4 |

Further details concerning materials, adhesive formulation and testing are described below.

Materials, Adhesive Formulation and Sample Testing

Dry tensile strengths, stretch, ratios thereof, modulus, break modulus, stress and strain are measured with a standard Instron test device or other suitable elongation tensile tester which may be configured in various ways, typically using 3 or 1 inch wide strips of material, suitably conditioned in an atmosphere of 23°±1° C. (73.4°±1° F.) at 50% relative humidity for 2 hours. This conditioning method is preferably employed for all specimens testing. The tensile test is typically run at a crosshead speed of 2 in/min. Tensile strength is sometimes referred to simply as "tensile" and is reported herein for NFC as breaking length (km), which is the tensile in kg/m divided by the basis weight of the sample in g/m². See U.S. Pat. No. 8,409,404 for additional measurements and details.

The term "Characteristic Breaking Length" when referring to NFC refers to the breaking length of a handsheet or film made from 100% of the NFC. The handsheet (50-70 g/m²) is made by using vacuum filtration and a suitable membrane as is described in more detail hereinafter followed by restrained air drying The modulus of a specimen (also referred to as stiffness modulus or tensile modulus) is determined by the procedure for measuring tensile strength described above, using a sample with a length of 1 inch and width of 15 mm (0.59 in), and the modulus recorded is the chord slope of the load/elongation curve measured over the range of 0-50 grams load. The specific modulus is the modulus divided by density.

Polyvinyl Alcohol and Characteristic PVOH Viscosity

Characteristic PVOH Viscosity is measured at 4 wt % solution of the polyvinyl alcohol in water at a temperature of 20° C. Viscosity is expressed in centipoises unless otherwise indicated, abbreviated cps or cP.

Polyvinyl alcohols for use in connection with the present invention include those obtainable from Sekisui Specialty Chemicals, Houston, Tex. as well as other suppliers and distributors. Commercial polyvinyl alcohol resins are produced by saponifying polyvinyl acetate and include significant levels of vinyl acetate repeat units. The degree of hydrolysis (mol %) indicates the mol % alcohol repeat units in the polyvinyl alcohol, with the remainder being in acetate form. A partially hydrolyzed polyvinyl alcohol may be used and dissolved in water that is from about 70 mole percent to about 90 mole percent hydrolyzed, such as from about 84 mole percent to about 89 mole percent hydrolyzed. Partially hydrolyzed polyvinyl alcohols more rapidly dissolve; however, polyvinyl alcohols that are hydrolyzed to a greater extent may be used. For instance, polyvinyl alcohols may also be used in the process that has a percent hydrolysis (mole %) of greater than 90%. In some cases, the polyvinyl alcohol may be from about 91% to about 99.31% hydrolyzed. The molecular weight of the polyvinyl alcohol used can also vary. A relatively low molecular weight polyvinyl alcohol may be used. For instance, the polyvinyl alcohol may have a viscosity at 4% solids and at 20° C. of less than about 10 cps. For instance, the viscosity of the polyvinyl alcohol at 4% solids and 20° C. can be from about 3.5 cps to about 4.5 cps. In other embodiments, however, higher molecular weight polyvinyl alcohols can be used that have a viscosity at 4% solids and at 20° C. of greater than about 5 cps, such as up to about 75 cps. Generally, polyvinyl alcohol or PVOH resins consist mostly of hydrolyzed polyvinyl acetate repeat units (more than 50 mole %), but may include monomers other than polyvinyl acetate in amounts up to about 10 mole % or so in typical commercial resins. Suitable co-monomers include vinyl co-monomers in general and especially those with carboxylate or sulfonate functionality as is seen in U.S. Pat. No. 7,642,226. Typical commercial polyvinyl alcohols are listed in Table 8 below.

TABLE 8

Commercial Polyvinyl Alcohol for Adhesive

| Grade | % Hydrolysis, | Viscosity, cps[1] | pH | Volatiles, % Max. | Ash, % Max.[3] |
|---|---|---|---|---|---|
| Super Hydrolyzed | | | | | |
| Selvol 125 | 99.3+ | 28-32 | 5.5-7.5 | 5 | 1.2 |
| Selvol 165 | 99.3+ | 62-72 | 5.5-7.5 | 5 | 1.2 |
| Fully Hydrolyzed | | | | | |
| Selvol 103 | 98.0-98.8 | 3.5-4.5 | 5.0-7.0 | 5 | 1.2 |
| Selvol 107 | 98.0-98.8 | 5.5-6.6 | 5.0-7.0 | 5 | 1.2 |
| Selvol 310 | 98.0-98.8 | 9.0-11.0 | 5.0-7.0 | 5 | 1.2 |
| Selvol 325 | 98.0-98.8 | 28.0-32.0 | 5.0-7.0 | 5 | 1.2 |
| Selvol 350 | 98.0-98.8 | 62-72 | 5.0-7.0 | 5 | 1.2 |
| Intermediate Hydrolyzed | | | | | |
| Selvol 418 | 91.0-93.0 | 14.5-19.5 | 4.5-7.0 | 5 | 0.9 |
| Selvol 425 | 95.5-96.5 | 27-31 | 4.5-6.5 | 5 | 0.9 |
| Partially Hydrolyzed | | | | | |
| Selvol 502 | 87.0-89.0 | 3.0-3.7 | 4.5-6.5 | 5 | 0.9 |
| Selvol 203 | 87.0-89.0 | 3.5-4.5 | 4.5-6.5 | 5 | 0.9 |
| Selvol 205 | 87.0-89.0 | 5.2-6.2 | 4.5-6.5 | 5 | 0.7 |

TABLE 8-continued

Commercial Polyvinyl Alcohol for Adhesive

| Grade | % Hydrolysis | Viscosity, cps[1] | pH | Volatiles, % Max. | Ash, % Max.[3] |
|---|---|---|---|---|---|
| Selvol 513 | 86.0-89.0 | 13-15 | 4.5-6.5 | 5 | 0.7 |
| Selvol 523 | 87.0-89.0 | 23-27 | 4.0-6.0 | 5 | 0.5 |
| Selvol 540 | 87.0-89.0 | 45-55 | 4.0-6.0 | 5 | 0.5 |

[1]4% aqueous solution, 20° C.

Commercial adhesive formulations containing PVOH are available from a variety of sources including H. B. fuller of Minnesota. Such compositions may contain optional additives if so desired. See U.S. Pat. No. 7,201,815.

Nanofibrillated Cellulose

NFC is commonly produced by mechanically disintegrating wood pulp, such as hardwood or softwood Kraft pulp which can include chemical pre- or post-treatments. The pulp used may be pre-processed enzymatically or chemically, for example, to reduce the quantity of hemicellulose. Furthermore, the cellulose fibers may be chemically modified, wherein the cellulose molecules contain functional groups other than in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose).

Generally, a high shear zone is formed during disintegration to delaminate multilayer cell walls of wood fibers and separate fibrils while minimizing cutting and entangling. This process is used to isolate high aspect ratio, semicrystalline cellulose fibrils with robust mechanical properties from the wood furnish. Nanofibrils are typically on the order of 4-20 nm wide and 500-2000 nm long. They possess good axial tensile strength due to inter- and intra-molecular hydrogen bonding among highly oriented cellulose molecules. Various processes suitable for making NFC are described in the following references: United States Patent Application Publication No. US 2011/0277947, entitled "Cellulose Nanofilaments and Method to Produce Same", of Hua et al.; United States Patent Application Publication No. US 2014/0083634, entitled "Method and an Apparatus for Producing Nanocellulose", of Bjoerkqvist et al.; and United States Patent Application Publication No. US 2014/0284407, entitled "A Method for Producing Nanofibrillar Cellulose", of Tamper et al.

The fiber morphology influences the amount of energy required to disintegrate it into NFC. Delamination can be facilitated by weakening fiber cell walls or decreasing the strength of fiber-to-fiber bonds through enzymatic or oxidative pretreatments as noted above. Pretreatments can be targeted to certain regions of the fiber or cause a general weakening effect. For example, cellulase enzymes degrade the amorphous portion of the fiber, whereas the TEMPO oxidation weakens the entire surface of the fiber by decreasing the degree of polymerization of cellulose. The TEMPO pretreatment weakens the fiber indiscriminately by converting primary hydroxyl groups of polysaccharides to carboxyl groups. The same techniques can also be used after mechanical fibrillation to achieve a desired quality of NFC. The choice and extent of pretreatment, as well as the morphology of the starting material, will influence the morphology of the nanofibrillated cellulose produced. For example, pulps that undergo extensive enzymatic hydrolysis before disintegration tend to be more uniform in size with a higher degree of crystallinity. With a lower fraction of amorphous cellulose, these fibers look more like cellulose nanocrystals and have a lower specific surface area. Mechanical disintegration with a microgrinder will increase the surface area of the fibrils and cause more branching. For glue reinforcement applications, this is a desired outcome as greater surface area will increase the amount of interfacial bonding with the matrix glue, PVOH.

Further details concerning making NFC or MFC with peroxide or ozone are seen in U.S. Pat. No. 7,700,764 to Heijnesson-Hultén, entitled Method of Preparing Microfibrillar Polysaccharide (Akzo Nobel N.V.); United States Patent Application Publication No. US 2015/0167243 of Bilodeau et al., entitled Energy Efficient Process for Preparing Nanocellulose Fibers (University of Main System Board of Trustees); and U.S. Pat. No. 8,747,612 to Heiskanen et al., entitled Process for the Production of Microfibrillated Cellulose in an Extruder and Microfibrillated Cellulose Produced According to the Process (Stora Enso OYJ). Discussion relating to making NFC or MFC with N-oxyl compounds is seen in U.S. Pat. No. 8,992,728 to Isogai et al., entitled Cellulose Nanofiber, Production Method of Same and Cellulose Nanofiber Dispersion (University of Tokyo); U.S. Pat. No. 8,377,563 to Miyawaki et al., entitled Papermaking Additive and Paper Containing the Same (Nippon Paper Industries Co., Ltd.); and U.S. Pat. No. 8,287,692 to Miyawaki et al., entitled Processes for Producing Cellulose Nanofibers (Nippon Paper Industries Co., Ltd.) which discloses a process for making nanofibers using N-oxyl compounds (TEMPO). References for making NFC or MFC with enzymes include U.S. Pat. No. 8,778,134 to Vehvilainen et al., entitled Process for Producing Microfibrillated Cellulose (Stora Enso OYJ); U.S. Pat. No. 8,728,273 to Heiskanen et al., entitled Process for the Production of a Composition Comprising Fibrillated Cellulose and a Composition (Stora Enso OYJ); U.S. Pat. No. 8,647,468 to Heiskanen et al., entitled Process for Producing Microfibrillated Cellulose (Stora Enso OYJ) which proposes two enzymatic treatments of the pulp used to make microfibers; and U.S. Pat. No. 8,546,558 to Ankerfors et al., entitled Method for the Manufacture of Microfibrillated Cellulose (STFI-Packforsk AB) which also relates to the use of an enzyme treatment.

NFC may be obtained through the University of Maine; see "The University of Maine—The Process Development Center—Nanofiber R & D," [Online]. Available: http://umaine.edu/pdc/nanofiber-r-d/. [Accessed 24 Nov. 2014]. This source is referred to as NFC I in the text and figures. NFC may also be obtained from Centre Technique du Papier in Grenoble, France. This source will be referred to as NFC II in the text and Figures. NFC may also be obtained from Paperlogic, operator of the first US commercial nanocellulose plant at the former Southworth Paper and now Paperlogic mill in Turners Falls, Mass. This source is referred to as NFC PL.

Table 9, below, shows energy input data and fiber length data for a typical disintegration process for making NFC, wherein the pulp employed was southern hardwood Kraft fines and the pulp was ground in a disk grinder at essentially zero gap. It is seen in Table 9 that the fiber length decreases substantially and the fines increase sharply as the pulp is ground. The NFC formed by this process is shown in the electron microscope image of FIG. 13. This source of NFC will be referred to as NFC III in the text and figures. While hardwood fines are generally regarded as an undesirable pulp fraction, they may be suitable for making NFC suitable for use in adhesives with the advantage that NFC produced from this material requires less energy input than NFC produced from Kraft pulp generally, which usually has a fines content of less than 50% by MorFi® fiber analysis, discussed below. Thus, the adhesives of the invention advantageously employ NFC made from pulp having greater than 50% fines (% files (Lw) as discussed below.

TABLE 9

Calculated energy input and fiber length for nanofibrillated cellulose made from Southern Hardwood Fines

| Time (min) | Power (watts) 264 | Net KW | Gross KW | Net energy Cumulative (KW-hr/mt) | Gross Energy/time increment | Gross energy cumulative (KW-hr/mt) | $L_w$ (mm) | Fines (% length) |
|---|---|---|---|---|---|---|---|---|
| 0 | 528 | 0.264 | | 0.0 | | 0.0 | 0.725 | 76.5 |
| 15 | 432 | 0.168 | 0.432 | 140.7 | 361.8 | 361.8 | 0.657 | 77.7 |
| 30 | 432 | 0.168 | 0.432 | 282.1 | 363.6 | 725.4 | 0.589 | 80.1 |
| 45 | 432 | 0.168 | 0.432 | 424.2 | 365.5 | 1090.9 | 0.528 | 83.7 |
| 60 | 408 | 0.144 | 0.408 | 546.7 | 346.9 | 1437.9 | 0.46 | 87 |
| 90 | 408 | 0.144 | 0.408 | 792.9 | 697.4 | 2135.3 | 0.374 | 93 |
| 105 | 408 | 0.144 | 0.408 | 916.6 | 350.5 | 2485.8 | 0.36 | 94 |

The fiber length data in Table 9 was measured with a MorFi® fiber analyzer (MFA) which calculates fiber length as:

$$L_w = \frac{\Sigma n_i L_i^2}{\Sigma n_i L_i}$$

i=1, 2 ... N categories (bins)

$n_i$=fiber count in the $i^{th}$ category/bin $L_i$=contour length–histogram class center length in the $i^{th}$ category/bin The smallest "fine" particle the MFA records include is about 5 μm and it measures fibers up to about 10 mm in length in the Lw calculation. While the analyzer excludes nanofibrils, the data nevertheless provides a characterization of the fibrillation process in terms of length reduction and fines increase as the cellulose pulp is nanofibrillated.

The MFA calculates the length weighted fines content by summing up the length of all the fines, Lfines, (i.e. 10 μm<fiber length<200 μm) divided by the length of all fibers, LT:

$$\% \; F(L_w) = \frac{\Sigma L_{fines}}{L_T}$$

For present purposes, NFC is characterized by viscosity profiles and breaking length as is discussed below.

Characteristic Nanofiber Viscosity and Adhesive Viscosity

Characteristic Nanofiber Viscosity is measured on a 1 wt % suspension of the subject NFC in water.

Viscosity of the glues and NFC suspensions is measured at room temperature, using a TA instruments Discovery Hybrid Rheometer (DHR) 2. A cone and plate geometry was used for analysis. A few drops of sample were placed on a flat metal peltier plate and the cone spindle, which has a 60 mm diameter and 2° angle, was brought down to make contact with the sample to initiate the spreading action. The sample that flowed out of the circumference of the cone spindle was trimmed. The experimental conditions were as follows: flow logarithmic sweep, shear rate 0.5-2000 Hz at room temperature. Trim and geometric gap was 54 microns. Room temperature means ambient temperature between 23° C. and 29° C., typically. If a specific value is required, 25° C. is used.

Viscosity Analysis of NFC

NFC suspensions were prepared to obtain 1% consistency. The suspensions were then characterized for their viscosity profiles using the test method and apparatus described above. Results appear in Table 10.

TABLE 10

NFC Viscosity Profiles

| shear rate, 1/s | NFC I Viscosity,cP | NFC II Viscosity, cP | NFC III Viscosity, cP | NFC Pl Viscosity, cP |
|---|---|---|---|---|
| 0.5 | 523000 | 989 | 9190 | 47567.1 |
| 0.8 | 366000 | 650 | 5940 | 30257 |
| 1.3 | 237000 | 387 | 4360 | 20858.7 |
| 2.0 | 144000 | 229 | 2910 | 18659.4 |
| 3.2 | 108000 | 144 | 2000 | 20986.7 |
| 5.0 | 80400 | 107 | 1320 | 33391.9 |
| 7.9 | 93300 | 80.9 | 843 | 50741.6 |
| 12.6 | 54100 | 61.2 | 548 | 51552.9 |
| 19.9 | 72000 | 50.3 | 579 | 53049.5 |
| 31.5 | 53200 | 53.8 | 1400 | 46991.5 |
| 50.0 | 21900 | 42 | 1300 | 17077.7 |
| 79.2 | 14100 | 23 | 1160 | 9200.18 |
| 126.0 | 5670 | 15.1 | 983 | 9716.41 |
| 199.0 | 2640 | 11.4 | 683 | 5740.54 |
| 315.0 | 1190 | 9.08 | 473 | 3052.84 |
| 500.0 | 553 | 7.61 | 303 | 1381.11 |
| 792.0 | 234 | 6.65 | 198 | 673.671 |
| 1260.0 | 100 | 6.15 | 132 | 307.663 |
| 1990.0 | 45.8 | 6.13 | 75.4 | 123.97 |
| 2000 | 30.8 | 6.03 | 79.5 | 111.168 |

Figure 14:
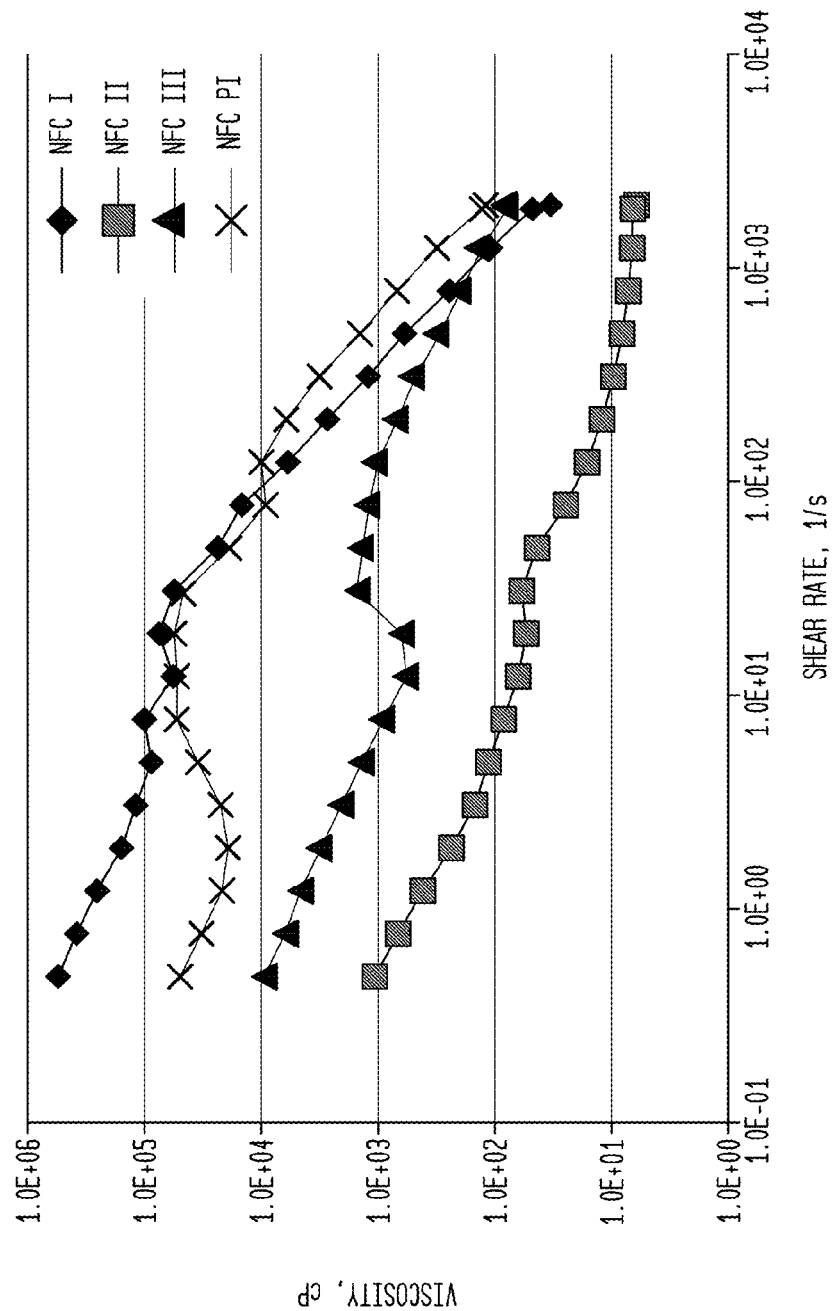
FIG. 14 is a plot of Characteristic Nanofiber Viscosity versus shear rate for 4 grades of NFC at 1% solids.

The data from Table 10 is shown graphically in FIG. 14. It is appreciated from FIG. 14 that NFC properties vary depending upon the degree of fibrillation, especially at low shear. At higher shear rates, viscosity values converge.

NFC Breaking Length, Stretch and Modulus

Figure 15:
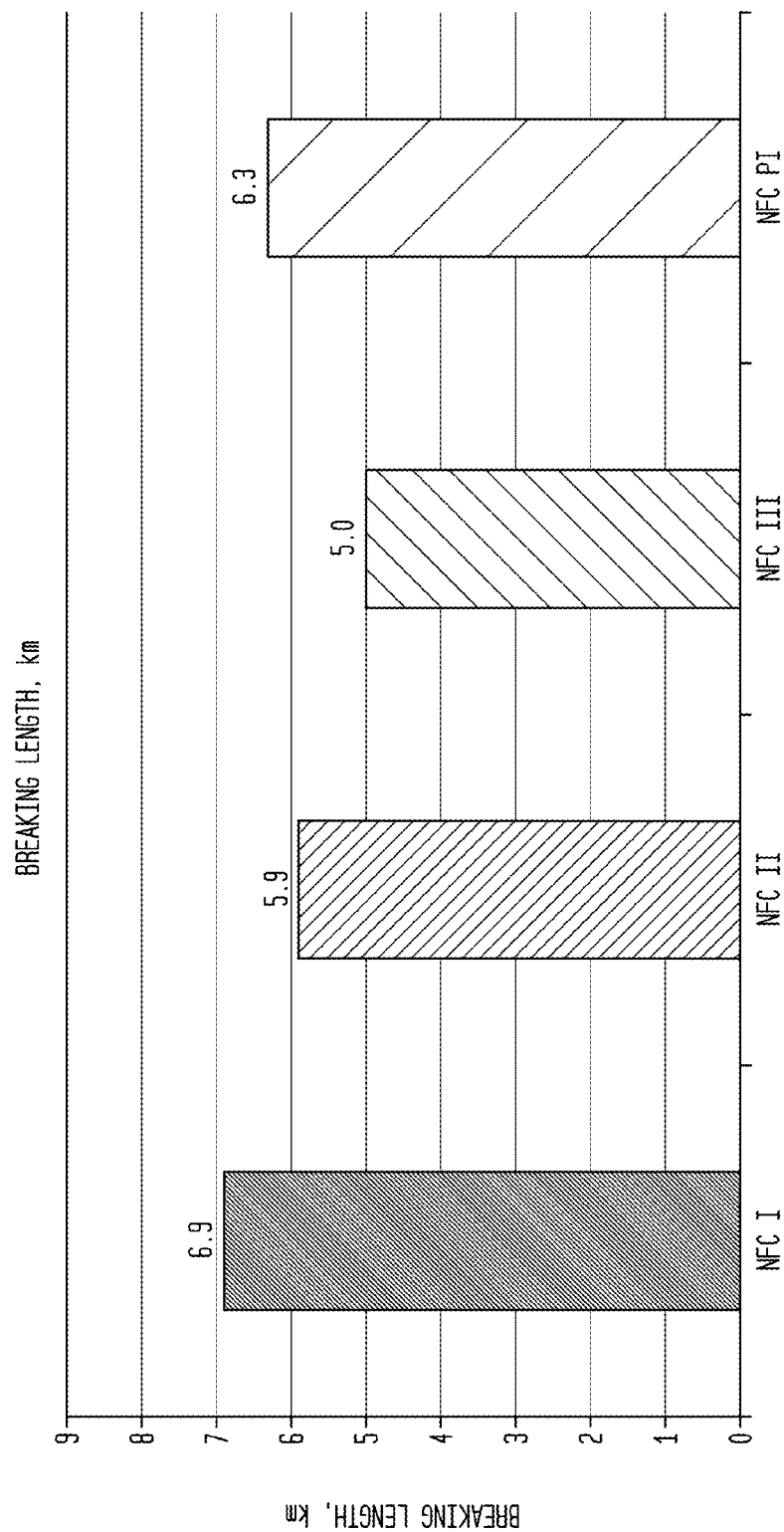
FIG. 15 is a histogram detailing breaking length for 4 grades of NFC formed into handsheets or films.
Figure 16:
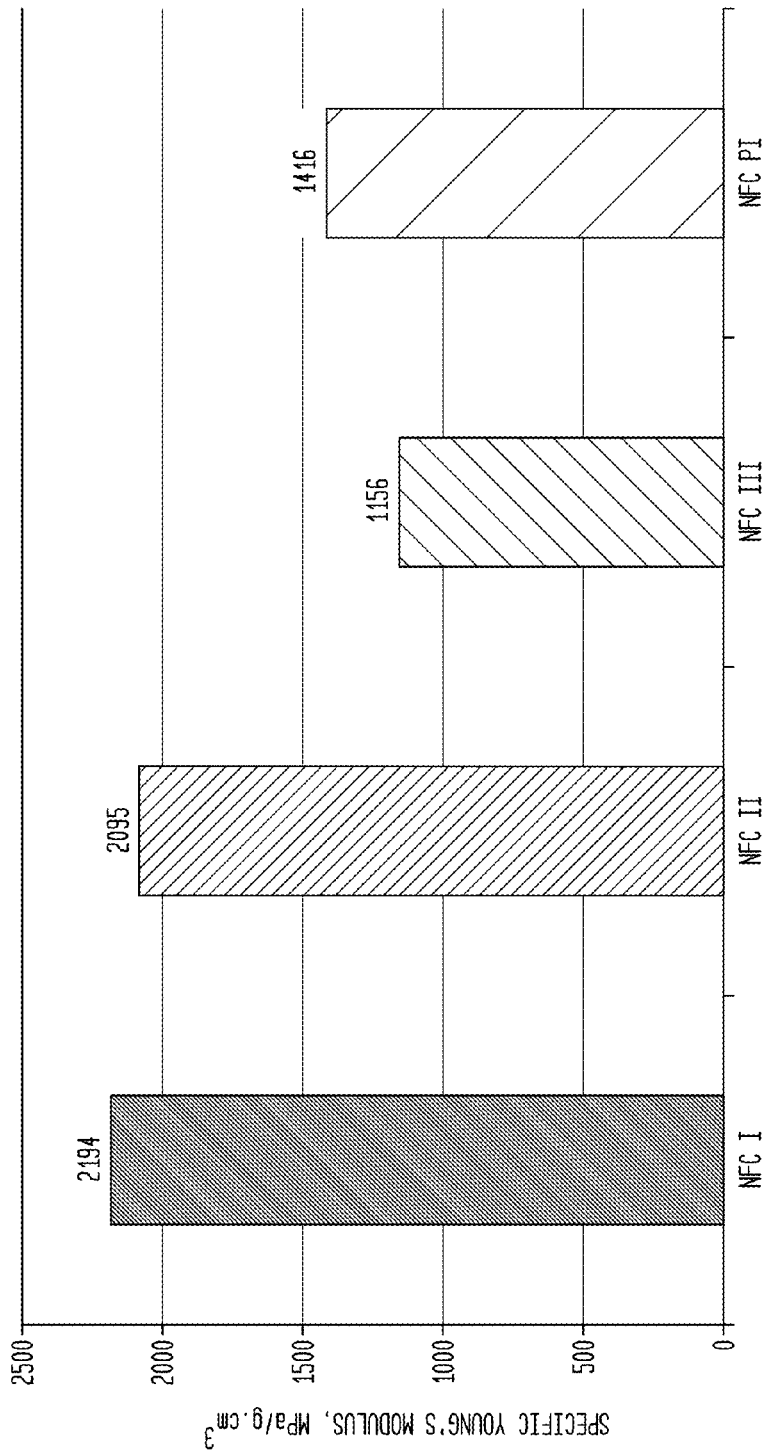
FIG. 16 is a histogram detailing maximum stretch, or stretch at break for 4 grades of NFC, formed into handsheets or film.
Figure 17:
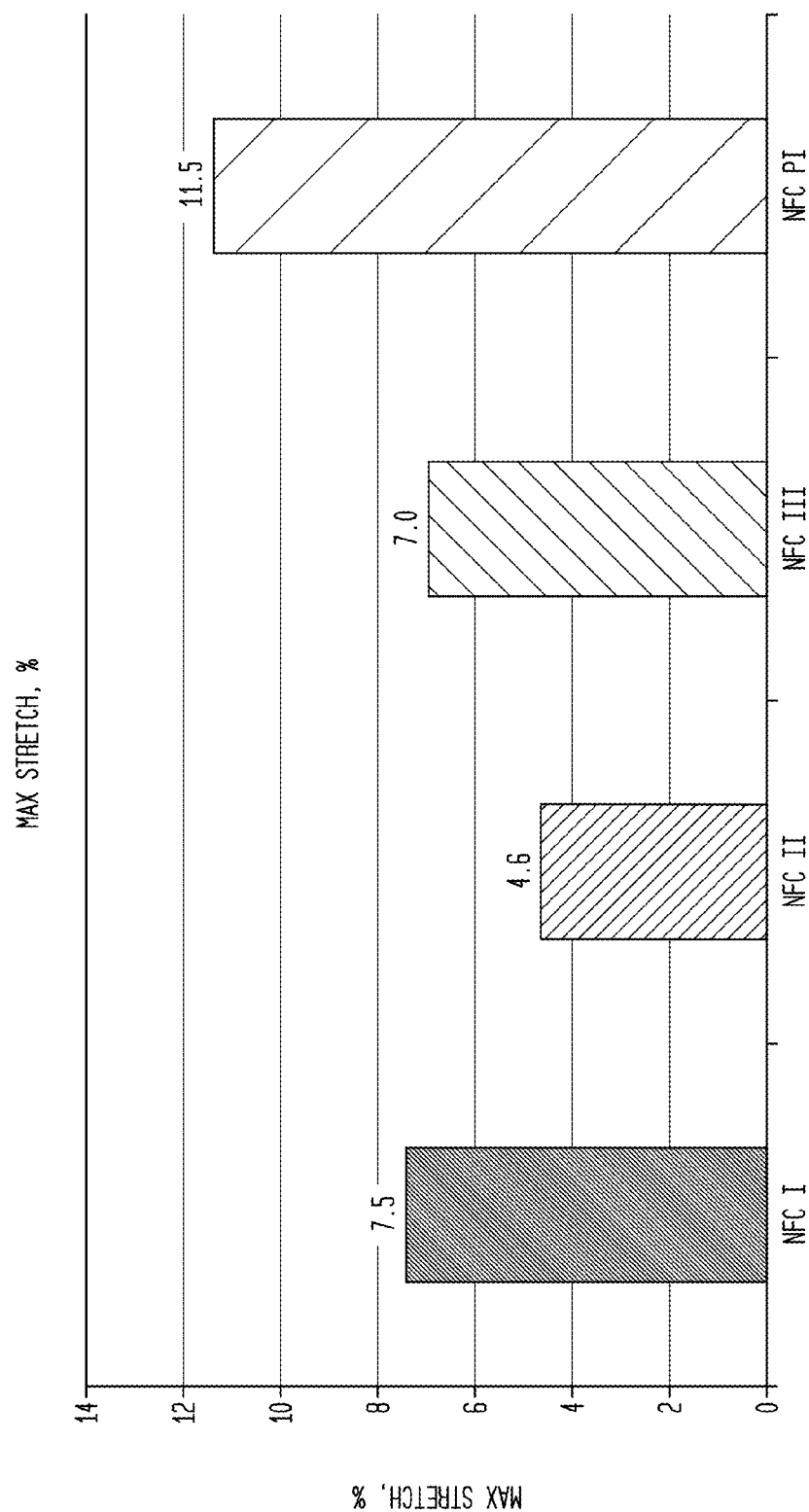
FIG. 17 is a histogram detailing Specific Young's modulus for 4 grades of NFC formed into handsheets or film.

100% NFC films or handsheets were formed by vacuum filtration using nylon membrane with 0.45 μm pore size utilizing the NFC I, NFC II, NFC III and NFC Pl materials. Fully restrained drying of NFC films was conducted by attachment of one side of the film to a metal plate and the other side was pressed by a customized perforated ring with a piece of heavy metal on top. The diameter of dried NFC films was 1.5 in. Each film was cut into a 15 mm×1 in strip for tensile testing which provided the information to calculate the breaking length, maximum stretch at break, and Specific Young's modulus. Results appear in Table 11, as well as in FIGS. 15, 16 and 17 for NFC I, II, III and PL.

TABLE 11

NFC Properties and Sheet Basis Weight

| Sample | Breaking length, km | Max stretch, % | Specific Young's modulus, Mpa/g.cm$^3$ | Basis Weight, g/m$^2$ |
|---|---|---|---|---|
| NFC I | 6.9 | 7.5 | 2194 | 56 |
| NFC II | 5.9 | 4.6 | 2095 | 59 |
| NFC III | 5.0 | 7.0 | 1156 | 69 |
| NFC Pl | 6.3 | 11.4 | 1416 | 62 |

Glue Formulation

Glue was formulated from commercial polyvinyl alcohol (PVOH) adhesive and NFC by diluting a commercially available 8% solids by weight aqueous PVOH adhesive and thoroughly mixing with NFC as detailed in Table 12, wherein it is seen Conventional PVOH glue was diluted to 4-6% solid content from commercial PVOH plybond water-based adhesive (WB2746, H.B. Fuller, 8% solids). Two types of NFC were employed in the formulations of Table 12: NFC I, a relatively fine grade in an aqueous dispersion, 3.28% by weight solids; NFC II, a somewhat coarser grade in an aqueous dispersion, 1.92% solids were mixed with the commercial PVOH to prepare NFC reinforced PVOH glues having the composition shown in Table 12.

TABLE 12

Preparation of Glue

| Glue # | Sample | PVOH Solids, % (w/w) | 8% PVOH, g | 3.28% NFC I, g | 1.92% NFC II, g | Water, g | Total, g |
|---|---|---|---|---|---|---|---|
| 1 | PVOH | 4 | 150 | | | 150.00 | 300.00 |
| 2 | | 4.5 | 170 | | | 132.22 | 302.22 |
| 3 | | 5 | 190 | | | 114.00 | 304.00 |
| 4 | | 5.5 | 210 | | | 95.45 | 305.45 |
| 5 | | 6 | 225 | | | 75.00 | 300.00 |
| 6 | PVOH + | 4 | 150 | 18.29 | | 131.71 | 300.00 |
| 7 | 5% NFC I | 4.5 | 170 | 20.73 | | 111.49 | 302.22 |
| 8 | | 5 | 190 | 23.17 | | 90.83 | 304.00 |
| 9 | | 5.5 | 210 | 25.61 | | 69.84 | 305.45 |
| 10 | | 6 | 225 | 27.44 | | 47.56 | 300.00 |
| 11 | PVOH + | 4 | 150 | | 31.25 | 118.75 | 300.00 |
| 12 | 5% NFC II | 4.5 | 170 | | 35.42 | 96.81 | 302.22 |
| 13 | | 5 | 190 | | 39.58 | 74.42 | 304.00 |
| 14 | | 5.5 | 210 | | 43.75 | 51.70 | 305.45 |
| 15 | | 6 | 225 | | 46.88 | 28.13 | 300.00 |

Figure 18:
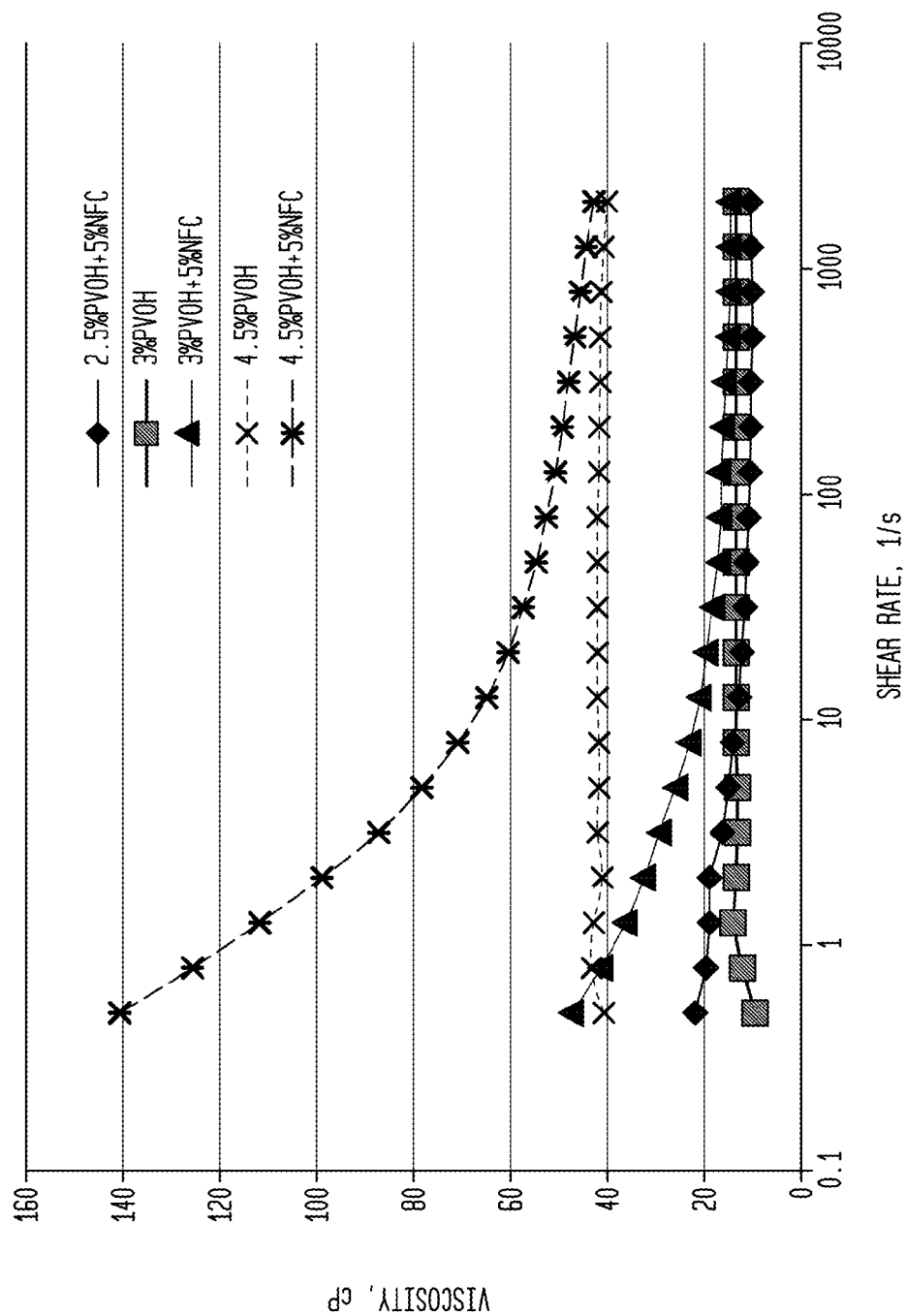
FIGS. 18 and 19 are plots of Adhesive Viscosity versus shear rate for various adhesives.
Figure 19:
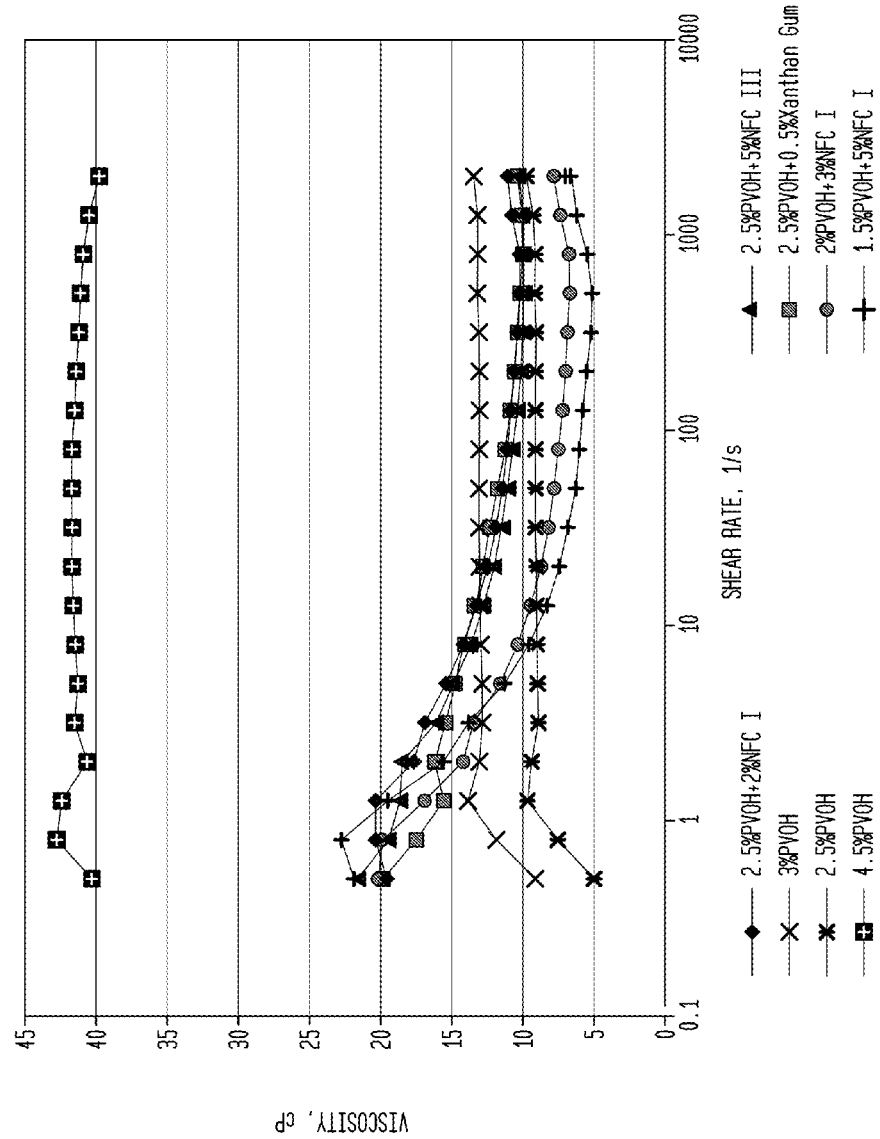

The above and additional glues with different levels of PVOH and NFC were tested for their viscosity with respect to shear rate using the procedure noted above. The viscosity of each glue represented as centiPoise vs. shear rate (γ, which is proportional to rotor speed and inversely related to gap) is shown in FIGS. 18 and 19. All the PVOH glues without NFC were typical newtonian fluids in which viscosity stays the same regardless of shear rate in the range of 0.5-2000 s$^{-1}$. Viscosity of 4.5% PVOH was over three times the viscosity of 3% PVOH. All the glues that contain 5% NFC based on the dry weight of PVOH displayed a shear thinning property. For the NFC reinforced glues, 3% PVOH+5% NFC and 4.5% PVOH+5% NFC, the incorporation of NFC significantly increased the viscosity of the glue and the degree of increase depends on the shear rate. Two glue samples, 3% PVOH and 2.5% PVOH+5% NFC, had very similar viscosity curves. Therefore, it is likely that a similar volume of glue will be applied on base web when using these two types of glue. However, 2.5% PVOH+5% NFC provides a benefit in terms of softness since less total PVOH is used as is seen in FIG. 1.

FIGS. 18, 19 likewise show that standard PVOH glue is converted from a Newtonian fluid to a pseudoplastic (shear-thinning) fluid by addition of a small quantity of NFC. Low-shear viscosity is also significantly increased. Glue containing 2.5% PVOH with NFC has a viscosity in a similar range as 3% PVOH. If the fluid dynamics of each glue results in the transfer of a similar liquid volume, it is reasonable to assume that the NFC glue supplied about 20% less PVOH (2.5/3). Softness is improved due to the smaller amount of glue being less detectable to touch. The glue/tissue interface between the applicator roll and emboss roll may involve the most important transfer of glue, and the shear rate becomes an important consideration for non-Newtonian fluids. If the shear rate is low, the alternative glues will have higher viscosity than 3% PVOH. If the shear rate is above about 10 sec$^{-1}$, the alternative glues will be thinner. Given that the roll speeds are matched and the nip pressure is low, the shear rate is expected to be low. Thus, the alternative glues are hypothesized to act as higher viscosity glues in terms of wet tack while delivering a smaller quantity of dry residual.

Peel Test Plybond

In order to characterize the adhesive strength of each glue, a strip of TAD basesheet was adhered to a metal plate followed by measurement of the force required to peel the sheet off. Ten drops of glue approximately 0.5 g was evenly spread on a 2"×8" stainless steel test panel plate using a number 40 wire rod to apply a film of approximately 50 microns, followed by attaching a 2"×12" TAD towel basesheet, see Table 3 for specifics to the glued plate surface and pressing it from one end to another for 3 times using a metal roller. After drying the glued towel basesheet, the plybond between basesheet and steel plate was measured by a peeling test using an Instron tensile test machine 5966. The free end of the basesheet strip was separated by hand for 2". The specimen was placed in the testing machine by clamping the steel plate in the bottom grip and turning up the free end of the basesheet and clamping it in the upper grip. The peeling test was performed by stripping the basesheet from the steel plate approximately at an angle of 180° and a ramp rate of 10"/min for 10" displacement. At least 6 specimens were tested for each glue sample. After each test, the steel plate was washed with DI water and acetone to remove the residual glue before the next use. These tests are generally in accordance with test method ASTM D 903-98 except for the differences noted.

Plybond

Generally the force needed to separate a ply of a multi-ply sheet or Plybond is measured with a Lab Master Slip and Friction tester available from Testing Machines, Inc. (Islandia, N.Y.) fitted with a sample clamp platform available from Research Dimensions (Neenah, Wis.). A top ply of the sample is separated and clamped in a clamp attached to a load cell and the average force required to separate the ply from another ply is recorded as the plies are separated. Details appear below for 2-ply testing; while 3-ply testing is substantially the same.

Plybond strengths reported herein are determined from the average load required to separate the plies of two-ply tissue, towel, napkin, and facial finished products using TMI Plybond Lab Master Slip & Friction tester Model 32-90, with high-sensitivity load measuring option and custom planar top without elevator available from: Testing Machines Inc. 2910 Expressway Drive South Islandia, N.Y. 11722; (800)-678-3221; www.testingmachines.com. Plybond clamps are available from: Research Dimensions, 1720 Oakridge Road, Neenah, Wis. 54956, Contact: 920-722-2289 and Fax: 920-725-6874.

Samples are preconditioned according to TAPPI standards and handled only by the edges and corners care being exercised to minimize touching the area of the sample to be tested.

At least ten sheets following the tail seal are discarded. Four samples are cut from the roll thereafter, each having a length equivalent to 2 sheets but the cuts are made ¼" away from the perf lines by making a first CD cut ¼" before a first perforation and a second CD cut ¼" before the third perforation so that the second perforation remains roughly centered in the sheet. The plies of the each specimen are initially separated in the leading edge area before the first perforation continuing to approximately ½" past this perforation.

The sample is positioned so that the interior ply faces upwardly, the separated portion of the ply is folded back to a location ½" from the initial cut and ¼" from the first perforation, and creased there. The folded back portion of the top ply is secured in one clamp so that the line contact of the top grip is on the perforation; and the clamp is placed back onto the load cell. The exterior ply of the samples is secured to the platform, aligning the perforation with the line contact of the grip and centering it with the clamp edges.

After ensuring that the sample is aligned with the clamps and perforations, the load-measuring arm is slowly moved to the left at a speed of 25.4 cm/min, the average load on the arm (in g.) is measured and recorded. The average of 3 samples is recorded with the fourth sample being reserved for use in case of damage to one of the first three. See U.S. Pat. No. 8,287,986.

Figure 2:
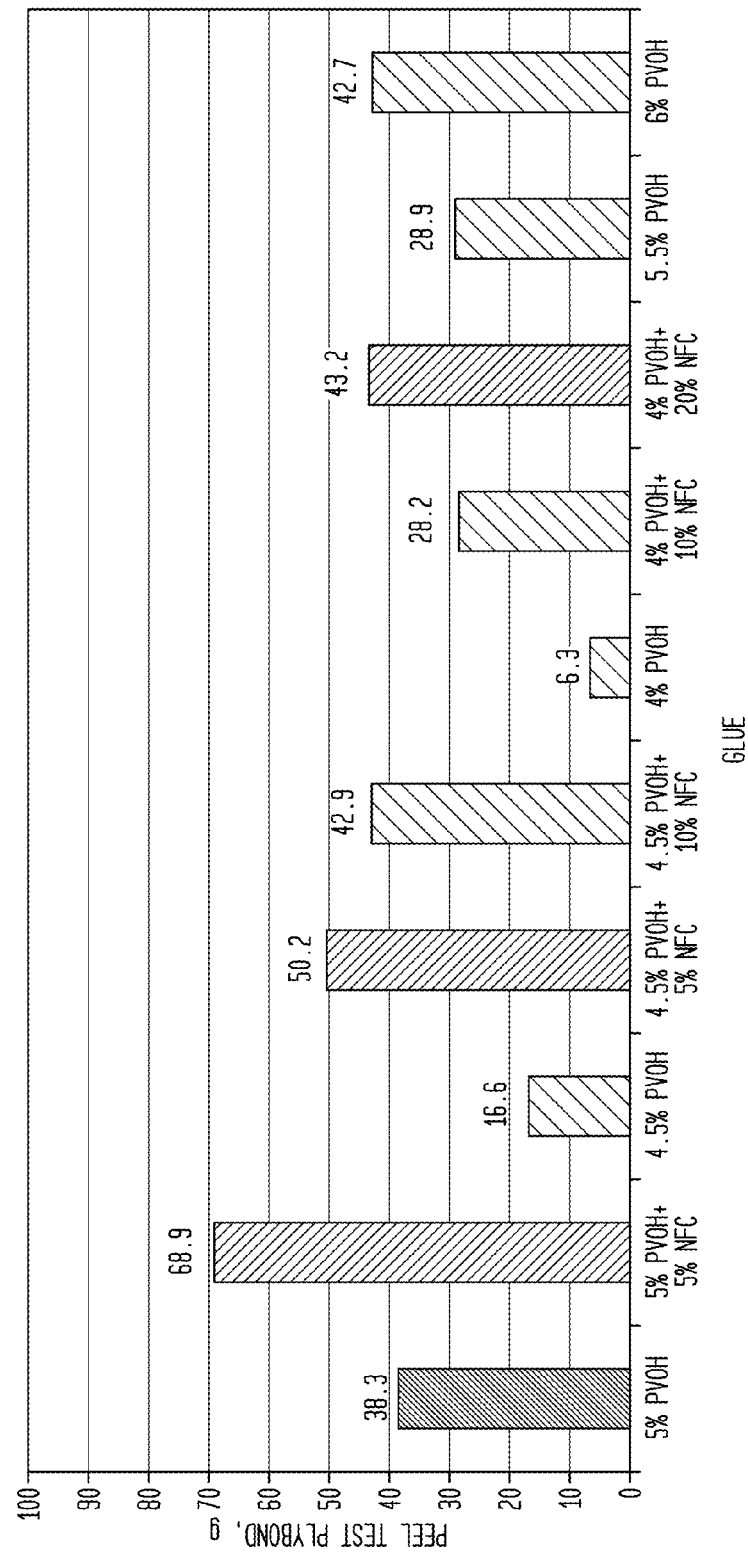
FIG. 2 is a histogram detailing Peel Test Plybond for various glue formulations applied to TAD towel.
Figure 10:
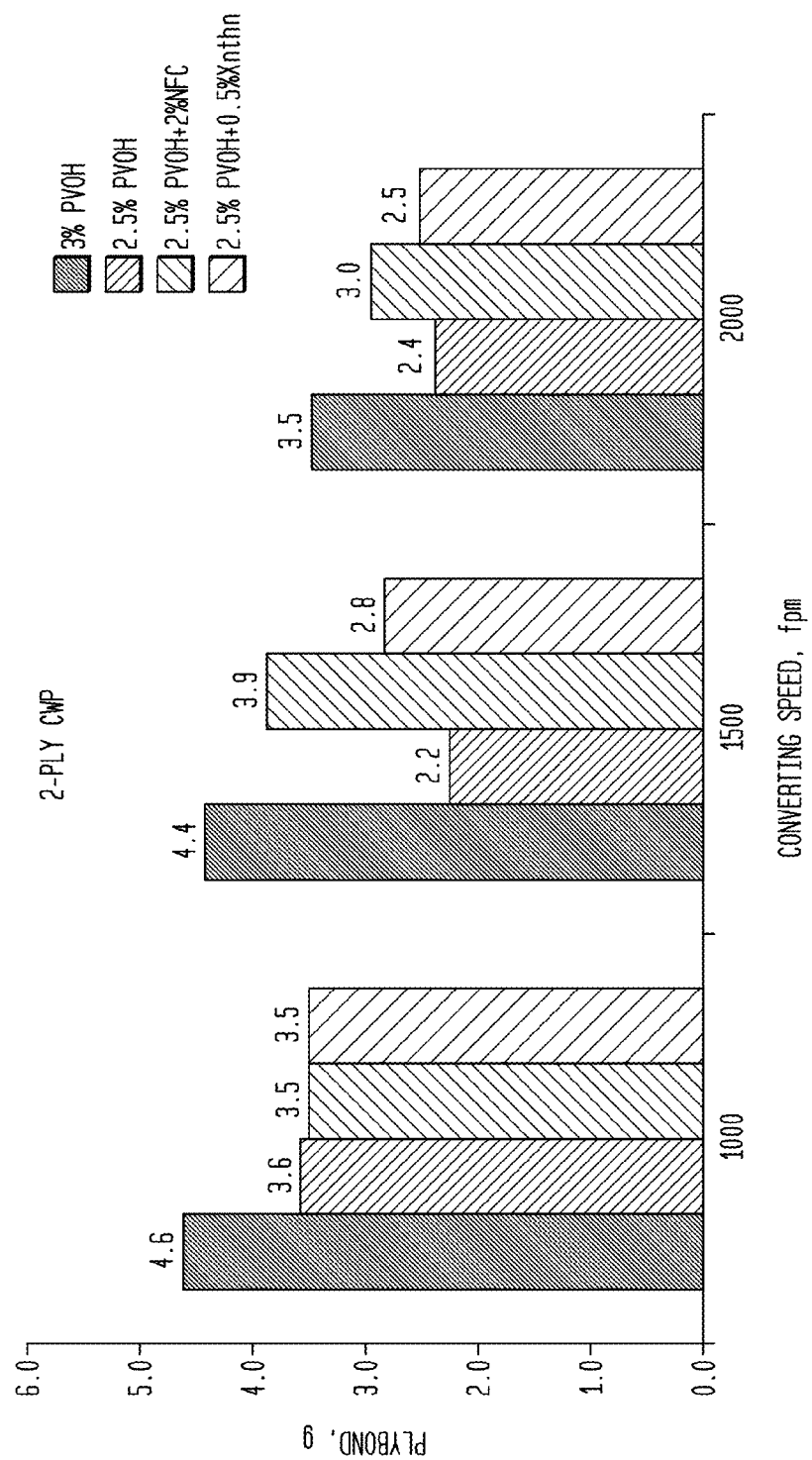
FIG. 10 is a histogram showing Plybond for various two-ply CWP tissue products at various converting speeds.
Figure 11:
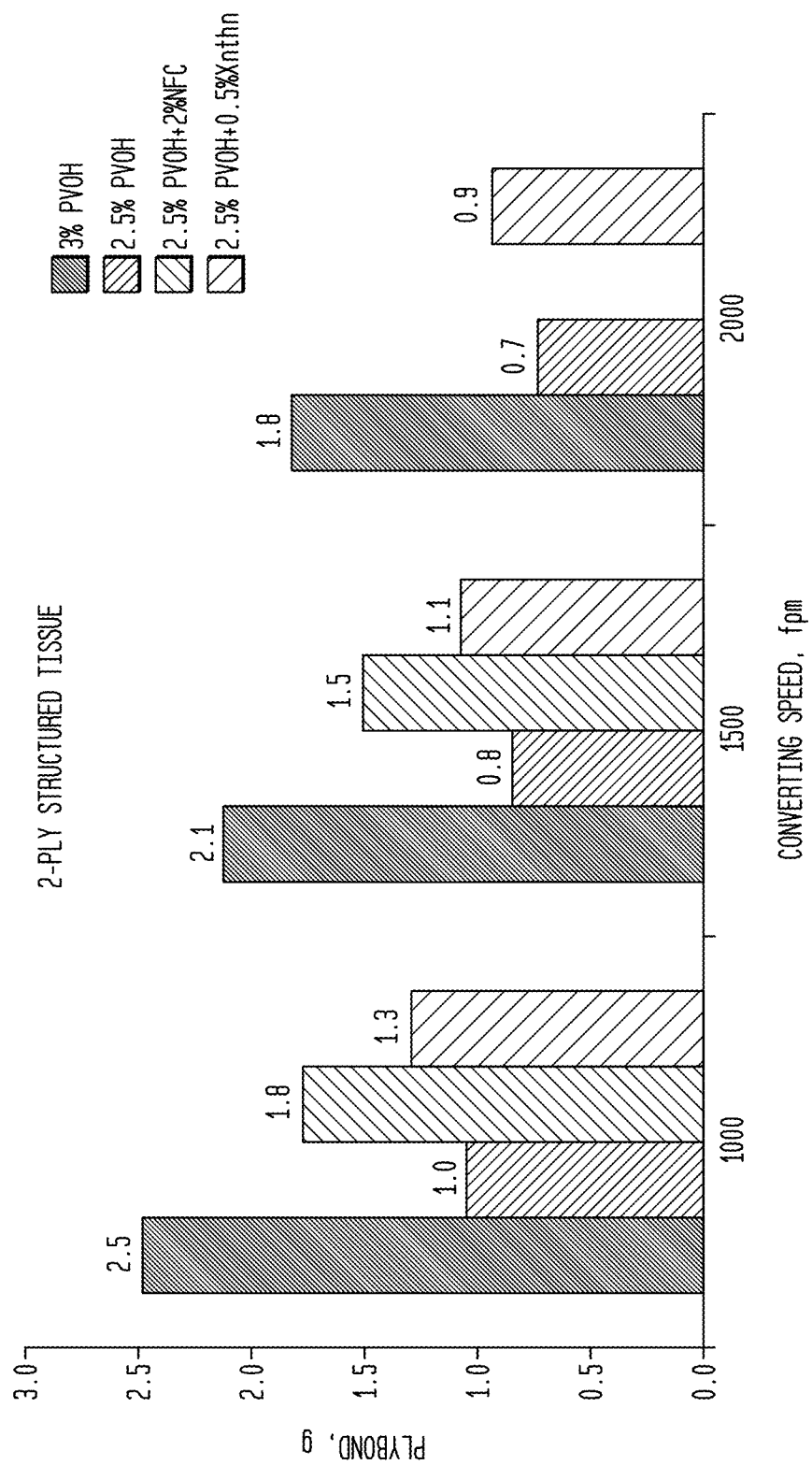
FIG. 11 is a histogram showing Plybond for 2-ply structured tissue products at various converting speeds.

Plybond and Peel Test Plybond values for various glues are shown in FIGS. 2, 6, 7, 10, 11, 20, 21 and 22. It is seen in FIG. 2, in particular, that NFC greatly increases Peel Test Plybond tested on TAD towel basesheet up to 300% and more, as compared to the same glue composition without any NFC. In FIGS. 6, 10, 11 it is seen that Plybond values are significantly increased by addition of NFC in relatively small amounts.

Figure 20:
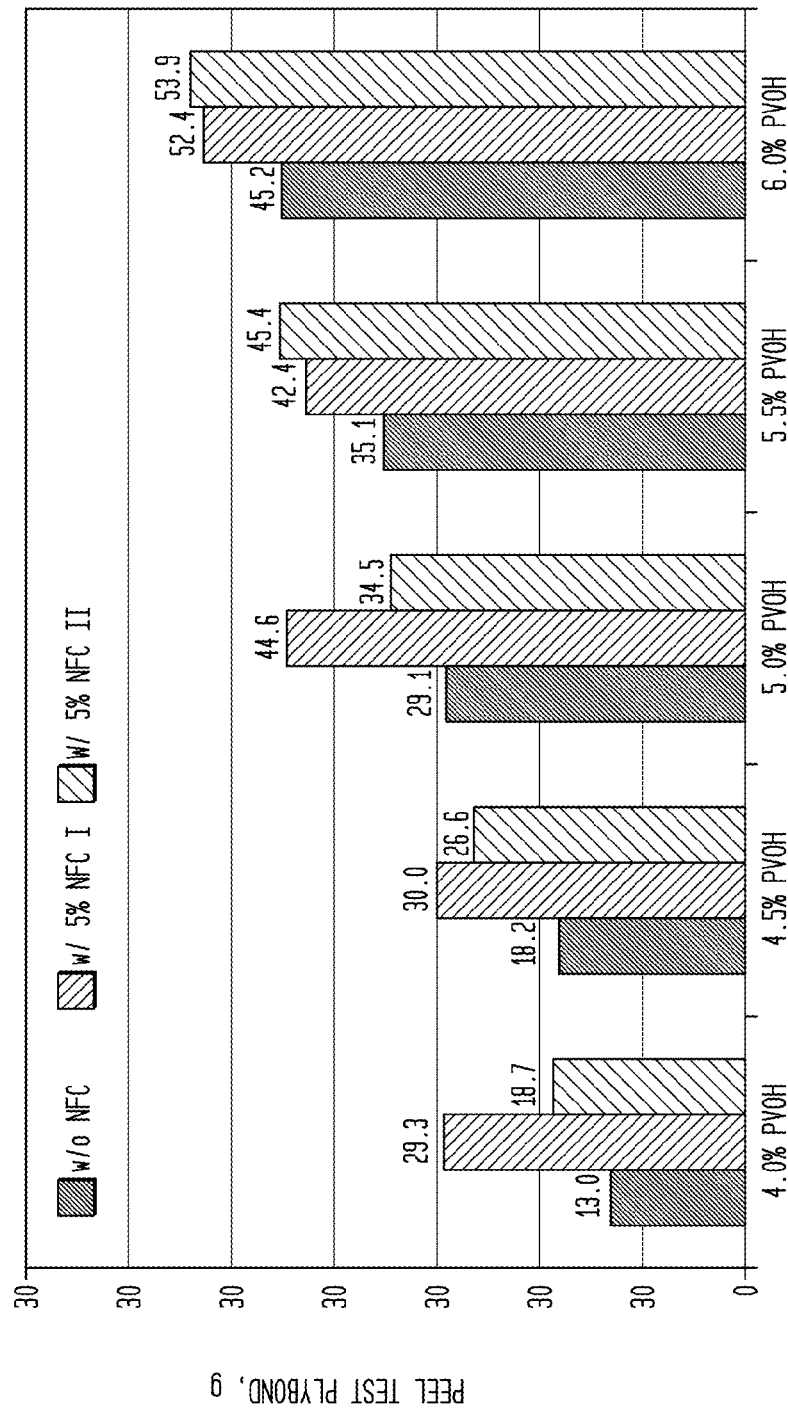
FIG. 20 is a histogram showing Peel Test Plybond for various glues.
Figure 21:
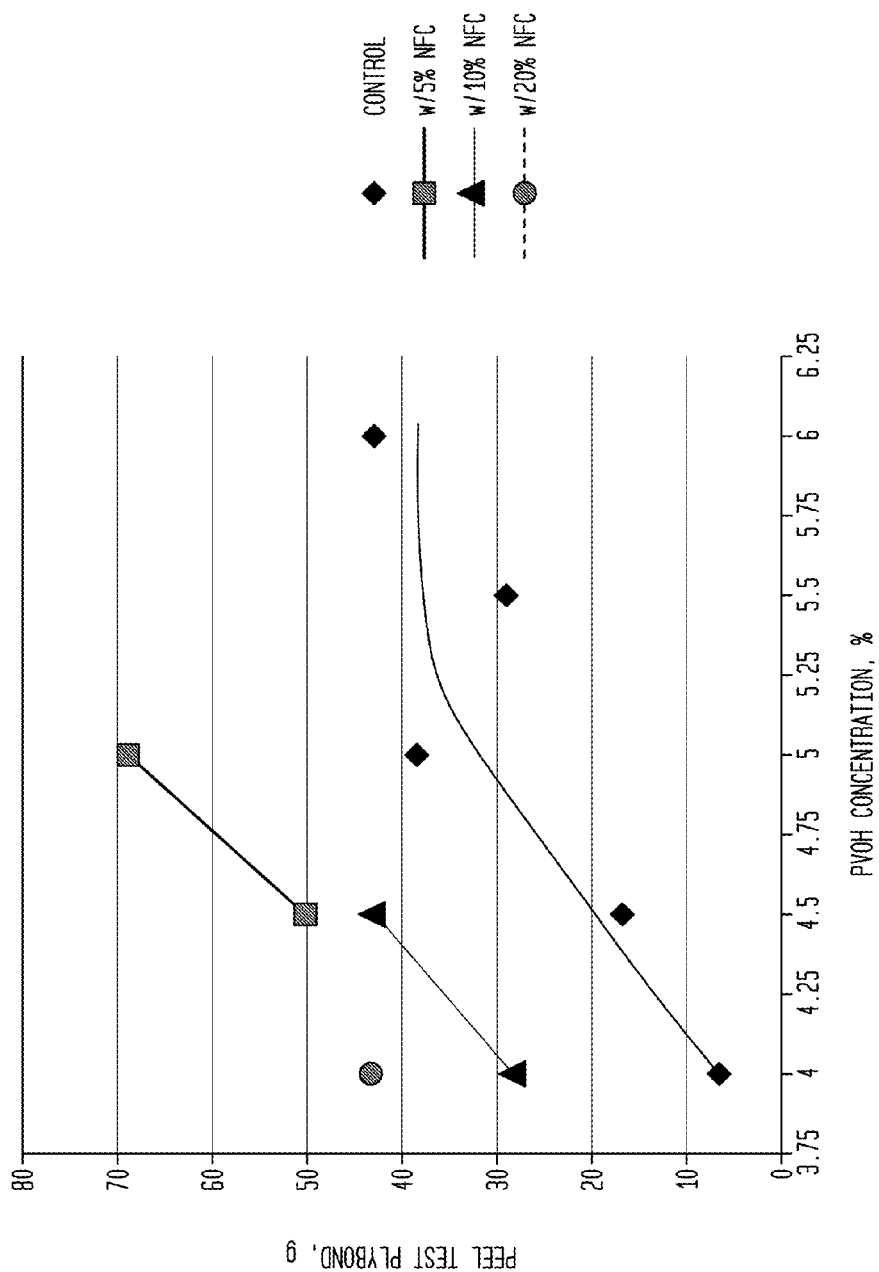
FIG. 21 is a plot showing Peel Test Plybond values for various glues as applied to TAD towel basesheet versus PVOH concentration in weight %.
Figure 22:
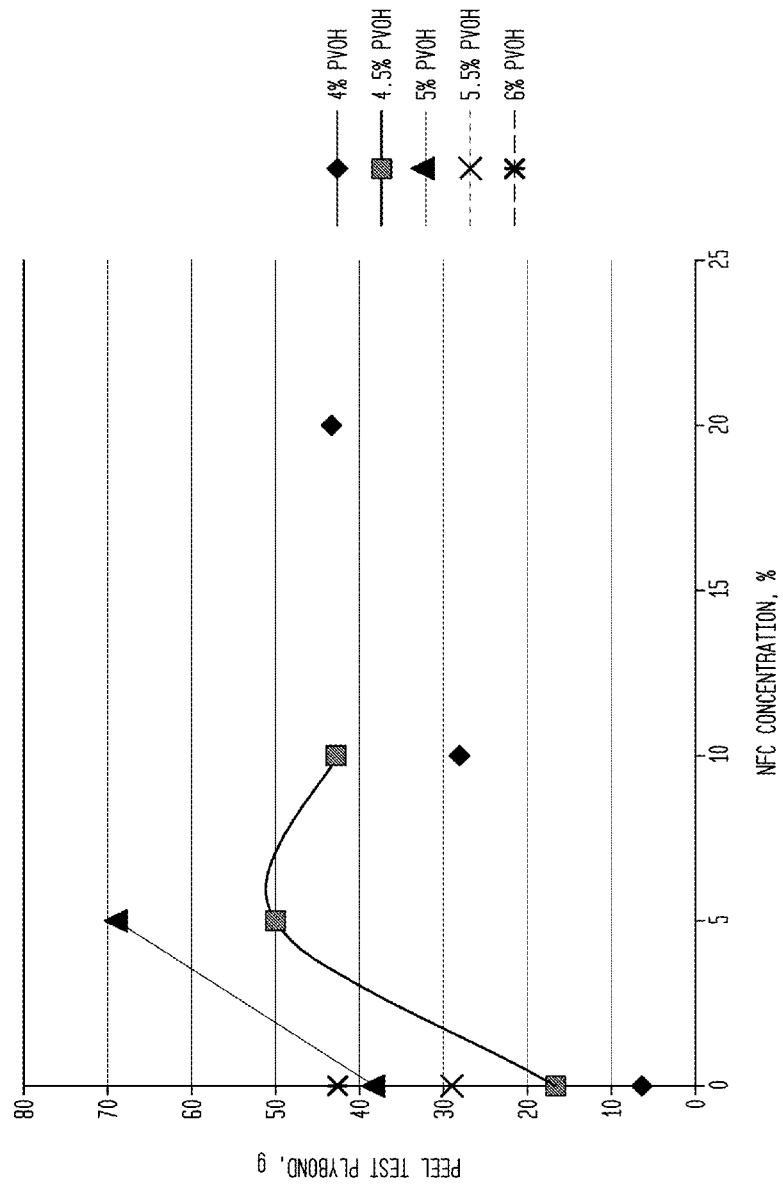
FIG. 22 is a plot of Peel Test Plybond versus NFC concentration in weight % based on PVOH content of the aqueous adhesive.

A comparison of the adhesion between conventional PVOH glues and NFC reinforced PVOH glues are shown in FIG. 20 for Peel Test Plybond tested on TAD towel. At each PVOH content from 4% to 6%, NFC I reinforced PVOH glues showed stronger adhesion than conventional PVOH. The differences in adhesion values were significant. Selected results also appear in FIGS. 21 and 22.

Glue Absorbency Rate

Without intending to be bound by any particular theory, the unexpected and advantageous properties in terms of softness and increased plybond realized in accordance with the invention are believed due, in part, to the longer absorption times (Glue Absorbency Rates) exhibited by the inventive adhesives on absorbent sheet in the absence of shear stress. The Glue Absorbency Rate is the time, in seconds, taken for the TAD towel basesheet, Table 3 to completely absorb a 0.05 ml droplet of tested glue. The longer time it takes, the more likely it is for glue to contribute to plybond rather than being wicked into the towel. The droplet is disposed on its surface by way of an automated syringe. The test specimens are preferably conditioned at 23° C.±1° C. (73.4±1.8° F.) at 50% relative humidity. For each sample, 4 3×3 inch test specimens are prepared. Each specimen is placed in a sample holder such that a high intensity lamp is directed toward the specimen. 0.05 ml of glue is deposited on the specimen surface and a stop watch is started. When the droplet is absorbed, as indicated by lack of further reflection of light from the drop, the stopwatch is stopped and the time recorded to the nearest 0.1 seconds. The procedure is repeated for each specimen and the results averaged for the sample. Glue Absorbency Rate is otherwise measured in accordance with TAPPI method T-432 cm-99.

Figure 23:
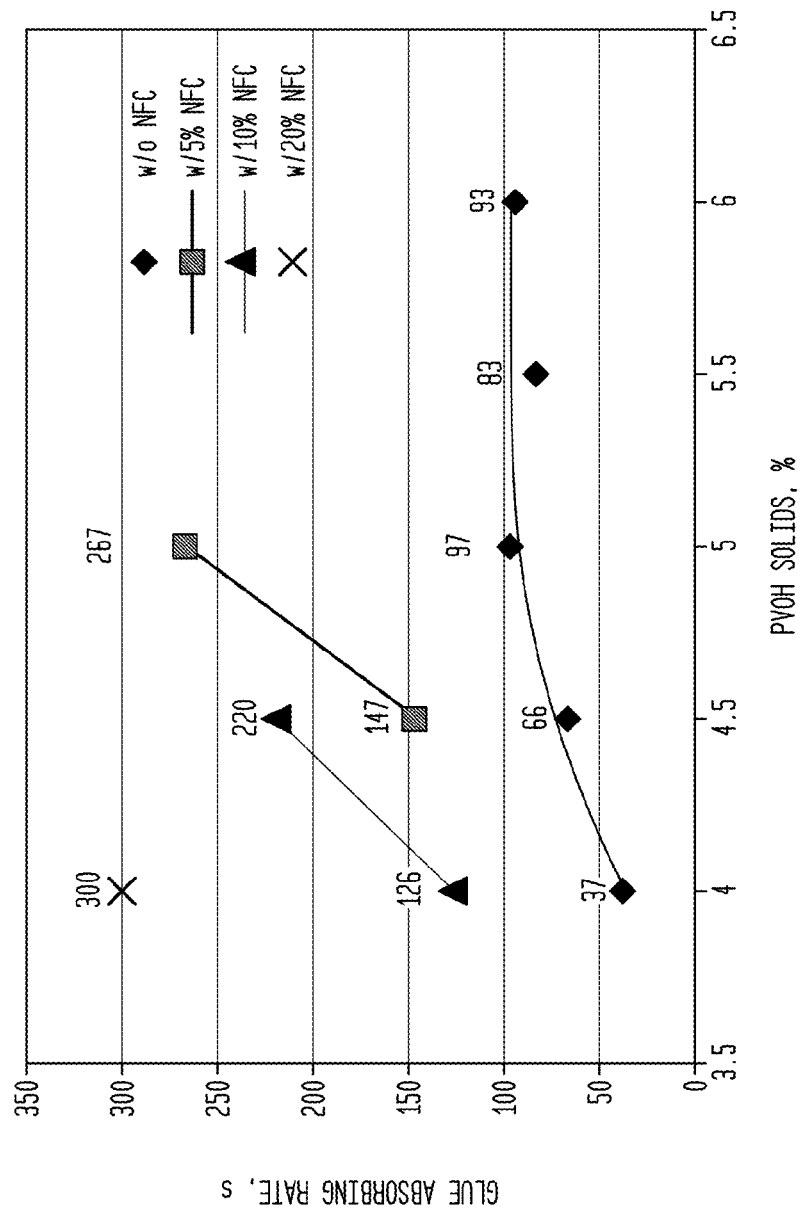
FIG. 23 is a plot of Glue Absorbency Rate versus PVOH content for various glues.

FIG. 23 is a plot of Glue Absorbency Rate versus PVOH solids on a TAD towel basesheet for various glues. It is seen that the absorption rate of regular PVOH glue increased with increasing PVOH concentration from 4% to 5%, and then leveled off from 5% to 6% PVOH. This trend was coincident with the changes of plybond. The absorption time dramatically increased with the addition of NFC at addition level from 5% to 20%; as more NFC was added, the longer the absorption time. This result is consistent with the notion that the reinforcement function of NFC glue as the presence of NFC not only contributes to the hydrogen bonding with the paper, it also largely restricts the penetration of liquid glue into the basesheet, allowing the majority of glue to stay as a glue film for developing plybond rather than being wicked by the basesheet. In this way, it is possible to avoid excessive application of plybond glue which stiffens the basesheet and reduces the softness of the product.

Embodiments of the Invention

There is thus provided in accordance with the invention in one aspect, embodiment No. 1 which is directed to a multi-ply absorbent sheet comprising:
(a) a first absorbent ply of cellulosic sheet;
(b) a second absorbent ply of cellulosic sheet; and
(c) a ply bonding adhesive interposed between said first absorbent ply and said second absorbent ply, said ply-bonding adhesive adhering said absorbent plies together,
wherein said ply-bonding adhesive comprises polyvinyl alcohol and nanofibrillated cellulose.

Embodiment No. 2 is the multi-ply absorbent sheet according to Embodiment No. 1, wherein said nanofibrillated cellulose has a Characteristic Breaking Length of at least 3 km.

Embodiment No. 3 is the multi-ply absorbent sheet according to any of the foregoing embodiments, wherein said nanofibrillated cellulose has a Characteristic Breaking Length of from 3 km to 10 km.

Embodiment No. 4 is the multi-ply absorbent sheet according to any of the foregoing embodiments, wherein said nanofibrillated cellulose has a Characteristic Breaking Length of from 4.5 km to 9 km.

Embodiment No. 5 is the multi-ply absorbent sheet according to any of the foregoing embodiments, wherein said nanofibrillated cellulose has a Characteristic Breaking Length of from 6.5 km to 7.5 km.

Embodiment No. 6 is the multi-ply absorbent sheet according to any of the foregoing embodiments, wherein said nanofibrillated cellulose has a Characteristic Nanofiber Viscosity of greater than 200,000 cP at a shear rate of 1 $sec^{-1}$ and a Characteristic Nanofiber Viscosity of less than 50,000 cP at a shear rate of 50 $sec^{-1}$.

Embodiment No. 7 is the multi-ply absorbent sheet according to any of the foregoing embodiments, wherein said nanofibrillated cellulose has a Characteristic Nanofiber Viscosity of greater than 350 cP at a shear rate of 1 $sec^{-1}$ and a Characteristic Nanofiber Viscosity of less than 50 cP at a shear rate of 50 $sec^{-1}$.

Embodiment No. 8 is the multi-ply absorbent sheet according to any of the foregoing embodiments, wherein said nanofibrillated cellulose has a Characteristic Nanofiber Viscosity of greater than 4,000 cP at a shear rate of 1 $sec^{-1}$ and a Characteristic Nanofiber Viscosity of less than 1,500 cP at a shear rate of 50 $sec^{-1}$.

Embodiment No. 9 is the multi-ply absorbent sheet according to any of the foregoing embodiments, wherein said nanofibrillated cellulose exhibits a Characteristic Nanofiber Viscosity reduction of at least 50% as the shear rate is increased from 1 $sec^{-1}$ to 50 $sec^{-1}$.

Embodiment No. 10 is the multi-ply absorbent sheet according to any of the foregoing embodiments, wherein said nanofibrillated cellulose exhibits a Characteristic Nanofiber Viscosity reduction of at least 60% as the shear rate is increased from 1 $sec^{-1}$ to 50 $sec^{-1}$.

Embodiment No. 11 is the multi-ply absorbent sheet according to any of the foregoing embodiments, wherein said nanofibrillated cellulose exhibits a Characteristic Nanofiber Viscosity reduction of at least 70% as the shear rate is increased from 1 $sec^{-1}$ to 50 $sec^{-1}$.

Embodiment No. 12 is the multi-ply absorbent sheet according to any of the foregoing embodiments, wherein said nanofibrillated cellulose has a Characteristic Nanofiber Viscosity of greater than 15,000 cP at a shear rate of 5 $sec^{-1}$ and a Characteristic Nanofiber Viscosity of less than 2,000 cP at a shear rate of 500 $sec^{-1}$.

Embodiment No. 13 is the multi-ply absorbent sheet according to any of the foregoing embodiments, wherein said nanofibrillated cellulose exhibits a Characteristic Nanofiber Viscosity reduction of at least 60% as the shear rate is increased from 5 $sec^{-1}$ to 500 $sec^{-1}$.

Embodiment No. 14 is the multi-ply absorbent sheet according to any of the foregoing embodiments, wherein said nanofibrillated cellulose exhibits a Characteristic Nanofiber Viscosity reduction of at least 70% as the shear rate is increased from 5 $sec^{-1}$ to 500 $sec^{-1}$.

Embodiment No. 15 is the multi-ply absorbent sheet according to any of the foregoing embodiments, wherein said nanofibrillated cellulose exhibits a Characteristic Nanofiber Viscosity reduction of at least 80% as the shear rate is increased from 5 $sec^{-1}$ to 500 $sec^{-1}$.

Embodiment No. 16 is the multi-ply absorbent sheet according to any of the foregoing embodiments, wherein said nanofibrillated cellulose exhibits a Characteristic Nanofiber Viscosity reduction of at least 90% as the shear rate is increased from 5 $sec^{-1}$ to 500 $sec^{-1}$.

Embodiment No. 17 is the multi-ply absorbent sheet according to any of the foregoing embodiments, wherein the polyvinyl alcohol in the adhesives comprises partially hydrolyzed polyvinyl alcohol having a degree of hydrolysis between 70 and 98 mol %.

Embodiment No. 18 is the multi-ply absorbent sheet according to any of the foregoing embodiments, wherein the polyvinyl alcohol in the adhesive has a Characteristic PVOH Viscosity of from 3 to 75 cP.

Embodiment No. 19 is the multi-ply absorbent sheet according to any of the foregoing embodiments, wherein the polyvinyl alcohol in the adhesive has a Characteristic PVOH Viscosity of from 25 cP to 55 cP.

Embodiment No. 20 is the multi-ply absorbent sheet according to any of the foregoing embodiments, wherein the adhesive contains from 0.5% by weight to 20% or 30% or 40% or up to 50% by weight of nanofibrillated cellulose, based on the weight of polyvinyl alcohol.

Embodiment No. 21 is the multi-ply absorbent sheet according to any of the foregoing embodiments, wherein the adhesive contains from 1% by weight to 10% or 20% by weight of nanofibrillated cellulose, based on the weight of polyvinyl alcohol.

Embodiment No. 22 is the multi-ply absorbent sheet according to any of the foregoing embodiments, wherein the adhesive contains from 1.5% by weight to 5% by weight of nanofibrillated cellulose, based on the weight of polyvinyl alcohol.

Embodiment No. 23 is the multi-ply absorbent sheet according to any of the foregoing embodiments, wherein the adhesive contains from 1.75% by weight to 2.5% by weight of nanofibrillated cellulose, based on the weight of polyvinyl alcohol.

Embodiment No. 24 is the multi-ply tissue sheet according to any of the foregoing embodiments, wherein the adhesive is applied between the plies as an aqueous composition containing from 1.5% to 10% by weight of the composition polyvinyl alcohol.

Embodiment No. 25 is the multi-ply tissue sheet according to any of the foregoing embodiments, wherein the adhesive is applied between the plies as an aqueous composition containing from 1.5% to 6% by weight of the composition polyvinyl alcohol.

Embodiment No. 26 is the multi-ply absorbent sheet according to any of the foregoing embodiments, wherein the adhesive is applied between the plies as an aqueous composition containing from 1.5% to 3% by weight of the composition polyvinyl alcohol.

Embodiment No. 27 is the multi-ply absorbent sheet according to any of the foregoing embodiments, wherein the adhesive is applied between the plies in a discontinuous pattern.

Embodiment No. 28 is the multi-ply absorbent sheet according to Embodiment No. 27, wherein the discontinuous pattern corresponds to a pattern of raised embossments on one of the absorbent plies of cellulosic sheet.

Embodiment No. 29 is the multi-ply absorbent sheet according to any of the foregoing embodiments, wherein the multi-ply absorbent sheet is a multi-ply tissue sheet composed predominantly of hardwood papermaking fiber.

Embodiment No. 30 is the multi-ply tissue sheet according to Embodiment No. 29, wherein the adhesive is applied between the plies as an aqueous composition containing from 1.5% to 7.5% by weight of the composition polyvinyl alcohol and the adhesive comprises from 1.5% to 10% by weight nanofibrillated fiber based on the weight of polyvinyl alcohol.

Embodiment No. 31 is the multi-ply tissue sheet according to Embodiment No. 29, wherein the adhesive is applied between the plies as an aqueous composition containing from 1.5% to 3% by weight of the composition polyvinyl alcohol and the adhesive comprises from 1.5% to 10% by weight nanofibrillated fiber based on the weight of polyvinyl alcohol.

Embodiment No. 32 is the multi-ply tissue sheet according to Embodiment No. 29, having a basis weight of 20 to 40 lbs/3000 ft$^2$.

Embodiment No. 33 is the multi-ply absorbent sheet according to any one of Embodiment Nos. 1 through 28, wherein the multi-ply absorbent sheet is a multi-ply towel sheet composed predominantly of softwood fiber.

Embodiment No. 34 is the multi-ply towel sheet according to Embodiment No. 33, having a basis weight of from 20 to 40 lbs/3000 ft$^2$.

Embodiment No. 35 is the multi-ply absorbent sheet according to any of the foregoing embodiments, wherein the multi-ply sheet comprises a third absorbent ply of cellulosic sheet plied together with the first and second ply.

Embodiment No. 36 is the multiply absorbent sheet according to any of the foregoing embodiments, consisting of three plies laminated together, wherein the ply bonding adhesive is applied only between two plies prior to lamination.

Embodiment No. 37 is the multi-ply absorbent sheet according to any of the foregoing embodiments, which exhibits a Relative Plybond value of at least 110% as compared with a like product made without nanofibrillated cellulose in the adhesive.

Embodiment No. 38 is the multi-ply absorbent sheet according to any of the foregoing embodiments, which exhibits a Relative Plybond value of at least 125% as compared with a like product made without nanofibrillated cellulose in the adhesive.

Embodiment No. 39 is the multi-ply absorbent sheet according to any of the foregoing embodiments, which exhibits a Relative Plybond value of at least 140% as compared with a like product made without nanofibrillated cellulose in the adhesive.

Embodiment No. 40 is a method of making absorbent sheet comprising:
(a) feeding a first absorbent cellulosic basesheet to an embossing nip;
(b) embossing a pattern of raised embossments in said first basesheet;
(c) applying an aqueous adhesive containing polyvinyl alcohol and nanofibrillated cellulose to the raised embossments of said first sheet; and
(d) plying a second absorbent cellulosic basesheet with said first sheet by pressing said second cellulosic sheet to the adhesive disposed on the raised embossments of said first cellulosic sheet.

Embodiment No. 41 is the method of making a multi-ply absorbent sheet according to Embodiment No. 40, wherein said nanofibrillated cellulose has a Characteristic Breaking Length of at least 3 km.

Embodiment No. 42 is the method of making a multi-ply absorbent sheet according to Embodiment Nos. 40 or 41, wherein said nanofibrillated cellulose has a Characteristic Breaking Length of from 3 km to 10 km.

Embodiment No. 43 is the method of making a multi-ply absorbent sheet according to any one of Embodiment Nos. 40 through 42, wherein said nanofibrillated cellulose has a Characteristic Breaking Length of from 4.5 km to 9 km.

Embodiment No. 44 is the method of making a multi-ply absorbent sheet according to any one of Embodiment Nos. 40 through 43, wherein said nanofibrillated cellulose has a Characteristic Breaking Length of from 6.5 km to 7.5 km.

Embodiment No. 45 is the method of making a multi-ply absorbent sheet according to any one of Embodiment Nos. 40 through 44 wherein said nanofibrillated cellulose has a Characteristic Nanofiber Viscosity of greater than 200,000 cP at a shear rate of 1 sec$^{-1}$ and a Characteristic Nanofiber Viscosity of less than 50,000 cP at a shear rate of 50 sec$^{-1}$.

Embodiment No. 46 is the method of making a multi-ply absorbent sheet according to any one of Embodiment Nos. 40 through 45, wherein said nanofibrillated cellulose has a Characteristic Nanofiber Viscosity of greater than 350 cP at a shear rate of 1 sec$^{-1}$ and a Characteristic Nanofiber Viscosity of less than 50 cP at a shear rate of 50 sec$^{-1}$.

Embodiment No. 47 is the method of making a multi-ply absorbent sheet according to any one of Embodiment Nos. 40 through 46, wherein said nanofibrillated cellulose has a Characteristic Nanofiber Viscosity of greater than 4,000 cP at a shear rate of 1 sec$^{-1}$ and a Characteristic Viscosity of less than 1,500 cP at a shear rate of 50 sec$^{-1}$.

Embodiment No. 48 is the method of making a multi-ply absorbed sheet according to any one of Embodiment Nos. 40 through 47, wherein said nanofibrillated cellulose exhibits a Characteristic Nanofiber Viscosity reduction of at least 50% as the shear rate is increased from 1 sec$^{-1}$ to 50 sec$^{-1}$.

Embodiment No. 49 is the method of making a multi-ply absorbent sheet according to any one of Embodiment Nos. 40 through 48, wherein said nanofibrillated cellulose exhibits a Characteristic Nanofiber Viscosity reduction of at least 60% as the shear rate is increased from 1 sec$^{-1}$ to 50 sec$^{-1}$.

Embodiment No. 50 is the method of making a multi-ply absorbent sheet according to any one of Embodiment Nos. 40 through 49, wherein said nanofibrillated cellulose exhibits a Characteristic Nanofiber Viscosity reduction of at least 70% as the shear rate is increased from 1 sec$^{-1}$ to 50 sec$^{-1}$.

Embodiment No. 51 is the method of making a multi-ply absorbent sheet according to any one of Embodiments Nos. 40 through 50, wherein said nanofibrillated cellulose has a Characteristic Nanofiber Viscosity of greater than 15,000 cP at a shear rate of 5 sec$^{-1}$ and a Characteristic Nanofiber Viscosity of less than 2,000 cP at a shear rate of 500 sec$^{-1}$.

Embodiment No. 52 is the method of making a multi-ply absorbent sheet according to any one of Embodiments Nos. 40 through 51, wherein said nanofibrillated cellulose exhibits a Characteristic Nanofiber Viscosity reduction of at least 60% as the shear rate is increased from 5 sec$^{-1}$ to 500 sec$^{-1}$.

Embodiment No. 53 is the method of making a multi-ply absorbent sheet according to any one of Embodiments Nos. 40 through 52, wherein said nanofibrillated cellulose exhibits a Characteristic Nanofiber Viscosity reduction of at least 70% as the shear rate is increased from 5 sec$^{-1}$ to 500 sec$^{-1}$.

Embodiment No. 54 is the method of making a multi-ply absorbent sheet according to any one of Embodiments Nos. 40 through 53, wherein said nanofibrillated cellulose exhibits a Characteristic Nanofiber Viscosity reduction of at least 80% as the shear rate is increased from 5 sec$^{-1}$ to 500 sec$^{-1}$.

Embodiment No. 55 is the method of making a multi-ply absorbent sheet according to any one of Embodiments Nos. 40 through 54, wherein said nanofibrillated cellulose exhibits a Characteristic Nanofiber Viscosity reduction of at least 90% as the shear rate is increased from 5 sec$^{-1}$ to 500 sec$^{-1}$.

Embodiment No. 56 is the method of making a multi-ply absorbent sheet according to any one of Embodiments Nos. 40 through 55, wherein the polyvinyl alcohol in the adhesives comprises partially hydrolyzed polyvinyl alcohol having a degree of hydrolysis between 70 and 98 mol %.

Embodiment No. 57 is the method of making a multi-ply absorbent sheet according to any one of Embodiments Nos. 40 through 56, wherein the polyvinyl alcohol in the adhesive has a Characteristic PVOH Viscosity of from 3 to 75 cP.

Embodiment No. 58 is the method of making a multi-ply absorbent sheet according to any one of Embodiments Nos. 40 through 57, wherein the polyvinyl alcohol in the adhesive has a Characteristic PVOH Viscosity of from 25 cP to 55 cP.

Embodiment No. 59 is the method of making a multi-ply absorbent sheet according to any one of Embodiments Nos. 40 through 58, wherein the adhesive contains from 0.5% by weight to 20% or 30% or 40% or up to 50% by weight of nanofibrillated cellulose, based on the weight of polyvinyl alcohol.

Embodiment No. 60 is the method of making a multi-ply absorbent sheet according to any one of Embodiments Nos. 40 through 59, wherein the adhesive contains from 1% by weight to 10% by weight of nanofibrillated cellulose, based on the weight of polyvinyl alcohol.

Embodiment No. 61 is the method of making a multi-ply absorbent sheet according to any one of Embodiments Nos. 40 through 60, wherein the adhesive contains from 1.5% by weight to 5% by weight of nanofibrillated cellulose, based on the weight of polyvinyl alcohol.

Embodiment No. 62 is the method of making a multi-ply absorbent sheet according to any one of Embodiments Nos. 40 through 61, wherein the adhesive contains from 1.75% by weight to 2.5% by weight of nanofibrillated cellulose, based on the weight of polyvinyl alcohol.

Embodiment No. 63 is the method of making a multi-ply absorbent sheet according to any one of Embodiments Nos. 40 through 62, wherein the adhesive is applied between the plies as an aqueous solution containing from 1.5% to 10% by weight of the composition polyvinyl alcohol.

Embodiment No. 64 is the method of making a multi-ply absorbent sheet according to any one of Embodiments Nos. 40 through 63, wherein the adhesive is applied between the plies as an aqueous solution containing from 1.5% to 6% by weight of the composition polyvinyl alcohol.

Embodiment No. 65 is the method of making a multi-ply absorbent sheet according to any one of Embodiments Nos. 40 through 64, wherein the adhesive is applied between the plies as an aqueous solution containing from 1.5% to 3% by weight of the composition polyvinyl alcohol.

Embodiment No. 66 is the method of making a multi-ply absorbent sheet according to any of Embodiment Nos. 40 through 65, further comprising plying a third cellulosic basesheet with said first and second cellulosic basesheets without additional adhesive.

Embodiment No. 67 is a ply bonding adhesive for the manufacture of multi-ply paper tissue and multi-ply paper towel comprising:
  (a) water;
  (b) polyvinyl alcohol in an amount of from 1.5% to 10% by weight based on the weight of the adhesive composition; and
  (c) from 1% to 50% by weight of nanofibrillated cellulose based on the weight of polyvinyl alcohol in the adhesive.

Embodiment No. 68 is the ply bonding adhesive according to Embodiment No. 67, wherein said nanofibrillated cellulose has a Characteristic Breaking Length of at least 3 km.

Embodiment No. 69 is the ply bonding adhesive according to Embodiment Nos. 67 or 68, wherein said nanofibrillated cellulose has a Characteristic Breaking Length of from 3 km to 10 km.

Embodiment No. 70 is the ply bonding adhesive according to any one of Embodiment Nos. 67 through 69, wherein said nanofibrillated cellulose has a Characteristic Breaking Length of from 4.5 km to 9 km.

Embodiment No. 71 is the ply bonding adhesive according to any one of Embodiment Nos. 67 through 70, wherein said nanofibrillated cellulose has a Characteristic Breaking Length of from 6.5 km to 7.5 km.

Embodiment No. 72 is the ply bonding adhesive according to any one of Embodiment Nos. 67 through 71, wherein said nanofibrillated cellulose has a Characteristic Nanofiber Viscosity of greater than 200,000 cP at a shear rate of 1 $\sec^{-1}$ and a Characteristic Nanofiber Viscosity of less than 50,000 cP at a shear rate of 50 $\sec^{-1}$.

Embodiment No. 73 is the ply bonding adhesive according to any one of Embodiment Nos. 67 through 72, wherein said nanofibrillated cellulose has a Characteristic Nanofiber Viscosity of greater than 350 cP at a shear rate of 1 $\sec^{-1}$ and a Characteristic Nanofiber Viscosity of less than 50 cP at a shear rate of 50 $\sec^{-1}$.

Embodiment No. 74 is the ply bonding adhesive according to any one of Embodiment Nos. 67 through 73, wherein said nanofibrillated cellulose has a Characteristic Nanofiber Viscosity of greater than 4,000 cP at a shear rate of 1 $\sec^{-1}$ and a Characteristic Nanofiber Viscosity of less than 1,500 cP at a shear rate of 50 $\sec^{-1}$.

Embodiment No. 75 is the ply bonding adhesive according to any one of Embodiment Nos. 67 through 74, wherein said nanofibrillated cellulose exhibits a Characteristic Nanofiber Viscosity reduction of at least 50% as the shear rate is increased from 1 $\sec^{-1}$ to 50 $\sec^{-1}$.

Embodiment No. 76 is the ply bonding adhesive according to any one of Embodiment Nos. 67 through 75, wherein said nanofibrillated cellulose exhibits a Characteristic Nanofiber Viscosity reduction of at least 60% as the shear rate is increased from 1 $\sec^{-1}$ to 50 $\sec^{-1}$.

Embodiment No. 77 is the ply bonding adhesive according to any one of Embodiment Nos. 67 through 76, wherein said nanofibrillated cellulose exhibits a Characteristic Nanofiber Viscosity reduction of at least 70% as the shear rate is increased from 1 $\sec^{-1}$ to 50 $\sec^{-1}$.

Embodiment No. 78 is the ply bonding adhesive according to any one of Embodiment Nos. 67 through 77, wherein said nanofibrillated cellulose has a Characteristic Nanofiber Viscosity of greater than 15,000 cP at a shear rate of 5 $\sec^{-1}$ and a Characteristic Nanofiber Viscosity of less than 2,000 cP at a shear rate of 500 $\sec^{-1}$.

Embodiment No. 79 is the ply bonding adhesive according to any one of Embodiment Nos. 67 through 78, wherein said nanofibrillated cellulose exhibits a Characteristic Nanofiber Viscosity reduction of at least 60% as the shear rate is increased from 5 $\sec^{-1}$ to 500 $\sec^{-1}$.

Embodiment No. 80 is the ply bonding adhesive according to any one of Embodiment Nos. 67 through 79, wherein said nanofibrillated cellulose exhibits a Characteristic Nanofiber Viscosity reduction of at least 70% as the shear rate is increased from 5 $\sec^{-1}$ to 500 $\sec^{-1}$.

Embodiment No. 81 is the ply bonding adhesive according to any one of Embodiment Nos. 67 through 80, wherein said nanofibrillated cellulose exhibits a Characteristic Nanofiber Viscosity reduction of at least 80% as the shear rate is increased from 5 $\sec^{-1}$ to 500 $\sec^{-1}$.

Embodiment No. 82 is the ply bonding adhesive according to any one of Embodiment Nos. 67 through 81, wherein said nanofibrillated cellulose exhibits a Characteristic Nanofiber Viscosity reduction of at least 90% as the shear rate is increased from 5 sec$^{-1}$ to 500 sec$^{-1}$.

Embodiment No. 83 is the ply bonding adhesive according to any one of Embodiment Nos. 67 through 82, wherein the polyvinyl alcohol in the adhesives comprises partially hydrolyzed polyvinyl alcohol having a degree of hydrolysis between 70 and 98 mol %.

Embodiment No. 84 is the ply bonding adhesive according to any one of Embodiment Nos. 67 through 83, wherein the polyvinyl alcohol in the adhesive has a Characteristic PVOH Viscosity of from 3 to 75 cP.

Embodiment No. 85 is the ply bonding adhesive according to any one of Embodiment Nos. 67 through 84, wherein the polyvinyl alcohol in the adhesive has a Characteristic PVOH Viscosity of from 25 cP to 55 cP.

Embodiment No. 86 is the ply bonding adhesive according to any one of Embodiment Nos. 67 through 85, wherein the adhesive contains from 0.5% by weight to 20% or 30% or 40% or up to 50% by weight of nanofibrillated cellulose, based on the weight of polyvinyl alcohol.

Embodiment No. 87 is the ply bonding adhesive according to any one of Embodiment Nos. 67 through 86, wherein the adhesive contains from 1% by weight to 10% by weight of nanofibrillated cellulose, based on the weight of polyvinyl alcohol.

Embodiment No. 88 is the ply bonding adhesive according to any one of Embodiment Nos. 67 through 87, wherein the adhesive contains from 1.5% by weight to 5% by weight of nanofibrillated cellulose, based on the weight of polyvinyl alcohol.

Embodiment No. 89 is the ply bonding adhesive according to any one of Embodiment Nos. 67 through 88, wherein the adhesive contains from 1.75% by weight to 2.5% by weight of nanofibrillated cellulose, based on the weight of polyvinyl alcohol.

Embodiment No. 90 is the ply bonding adhesive according to any one of Embodiment Nos. 67 through 89, wherein the adhesive is applied between plies of a multi-ply absorbent sheet as an aqueous composition containing from 1.5% to 10% by weight of the composition polyvinyl alcohol.

Embodiment No. 91 is the ply bonding adhesive according to any one of Embodiment Nos. 67 through 90, wherein the adhesive is applied between plies of a multi-ply absorbent sheet as an aqueous composition containing from 1.5% to 6% by weight of the composition polyvinyl alcohol.

Embodiment No. 92 is the ply bonding adhesive according to any one of Embodiment Nos. 67 through 91, wherein the adhesive is applied between plies of a multi-ply absorbent sheet as an aqueous composition containing from 1.5% to 3% by weight of the composition polyvinyl alcohol.

Embodiment No. 93 is the ply bonding adhesive according to any one of Embodiment Nos. 67 through 92, wherein the adhesive comprises from 90-98.5% by weight of the composition water, from to 1.5% to 6% by weight of the composition polyvinyl alcohol and from 1% to 20% or 30% or 40% or up to 50% by weight of nanofibrillated cellulose based on the weight of polyvinyl alcohol in the adhesive.

Embodiment No. 94 is the ply bonding adhesive according to any one of Embodiment Nos. 67 through 93, wherein the adhesive comprises from 94-98.5% by weight of the composition water, from to 1.5% to 6% by weight of the composition polyvinyl alcohol and from 1% to 20% or 30% or 40% or up to 50% by weight of nanofibrillated cellulose based on the weight of polyvinyl alcohol in the adhesive.

Embodiment No. 95 is the ply bonding adhesive according to any one of Embodiment Nos. 67 through 94, wherein the adhesive comprises from 97-98.5% by weight of the composition water, from to 1.5% to 2.5% by weight of the composition polyvinyl alcohol and from 1% to 5% by weight of nanofibrillated cellulose based on the weight of polyvinyl alcohol in the adhesive.

Embodiment No. 96 is the ply bonding adhesive according to any one of Embodiment Nos. 67 through 94, wherein the adhesive comprises from 94-98.5% by weight of the composition water, from to 1.5% to 6% by weight of the composition polyvinyl alcohol and from 1% to 20% by weight of nanofibrillated cellulose based on the weight of polyvinyl alcohol in the adhesive.

Embodiment No. 97 is the ply bonding adhesive according to any one of Embodiment Nos. 67 through 96, wherein the adhesive consists essentially of water, polyvinyl alcohol and nanofibrillated cellulose.

Embodiment No. 98 is the ply bonding adhesive according to any one of Embodiment Nos. 67 through 97, wherein the adhesive exhibits an Adhesive Viscosity reduction of at least 15% as shear rate is increased from 1 sec$^{-1}$ to 100 sec$^{-1}$.

Embodiment No. 99 is the ply bonding adhesive according to any one of Embodiment Nos. 67 through 98, wherein the adhesive exhibits an Adhesive Viscosity reduction of at least 25% as shear rate is increased from 1 sec$^{-1}$ to 100 sec$^{-1}$.

Embodiment No. 100 is the ply bonding adhesive according to any one of Embodiment Nos. 67 through 99, wherein the adhesive exhibits an Adhesive Viscosity reduction of at least 50% as shear rate is increased from 1 sec$^{-1}$ to 100 sec$^{-1}$.

Embodiment No. 101 is the ply bonding adhesive according to any one of Embodiment Nos. 67 through 100, wherein the adhesive exhibits a Relative Peel Test Plybond value of at least 115% as compared to an adhesive of the same composition without nanofibrillated cellulose.

Embodiment No. 102 is the ply bonding adhesive according to any one of Embodiment Nos. 67 through 101, wherein the adhesive exhibits a Relative Peel Test Plybond value of at least 125% as compared to an adhesive of the same composition without nanofibrillated cellulose.

Embodiment No. 103 is the ply bonding adhesive according to any one of Embodiment Nos. 67 through 102, wherein the adhesive exhibits a Relative Peel Test Plybond value of at least 150% as compared to an adhesive of the same composition without nanofibrillated cellulose.

Embodiment No. 104 is the ply bonding adhesive according to any one of Embodiment Nos. 67 through 103, wherein the adhesive exhibits a Relative Peel Test Plybond value of at least 200% as compared to an adhesive of the same composition without nanofibrillated cellulose.

Embodiment No. 105 is the ply bonding adhesive according to any one of Embodiment Nos. 67 through 104, wherein the adhesive exhibits a Relative Peel Test Plybond value of at least 250% as compared to an adhesive of the same composition without nanofibrillated cellulose.

Embodiment No. 106 is the ply bonding adhesive according to any one of Embodiment Nos. 67 through 105, wherein the adhesive exhibits a Relative Peel Test Plybond value of at least 300% as compared to an adhesive of the same composition without nanofibrillated cellulose.

Embodiment No. 107 is the ply bonding adhesive according to any one of Embodiment Nos. 67 through 106, wherein the adhesive exhibits a Relative Peel Test Plybond value of at least 400% as compared to an adhesive of the same composition without nanofibrillated cellulose.

Embodiment No. 108 is a ply bonding adhesive composition for the manufacture of multi-ply paper tissue and multi-ply paper towel comprising: (a) water; (b) polyvinyl alcohol; and (c) nanofibrillated cellulose.

Embodiment no. 109 is the ply bonding adhesive composition according to Embodiment No. 108, wherein the adhesive comprises from 90-98.5% by weight of the composition water, from to 0.5% to 10% by weight of the composition polyvinyl alcohol and from 0.05% to 2.5% by weight of the composition nanofibrillated cellulose.

Embodiment No. 110 is the ply bonding adhesive composition according to Embodiment Nos. 108 or 109, wherein the weight ratio of nanofibrillated cellulose:PVOH is greater than 0.025 and up to 2.

Embodiment No. 111 is the ply bonding adhesive composition according to Embodiment Nos. 108 to 110, wherein the weight ratio of nanofibrillated cellulose:PVOH is greater than 0.25 and up to 2.

Embodiment No. 112 is the ply bonding adhesive composition according to any of Embodiment Nos. 108 to 110, wherein the weight ratio of nanofibrillated cellulose:PVOH is greater than 0.2.

Embodiment No. 113 is the ply bonding adhesive composition according to any of Embodiment Nos. 108 to 112, wherein the weight ratio of nanofibrillated cellulose:PVOH is greater than 0.3

Embodiment No. 114 is the ply bonding adhesive composition according to any of Embodiment Nos. 108 to 113, wherein the weight ratio of nanofibrillated cellulose:PVOH is greater than 0.4.

Embodiment No. 115 is the ply bonding adhesive composition according to any of Embodiment Nos. 108 to 114, wherein the weight ratio of nanofibrillated cellulose:PVOH is greater than 0.5.

Embodiment No. 116 is the ply bonding adhesive composition according to any of Embodiment Nos. 108 to 115, wherein the weight ratio of nanofibrillated cellulose:PVOH is greater than 0.6.

Embodiment No. 117 is the ply bonding adhesive composition according to any of Embodiment Nos. 108 to 110, wherein the weight ratio of nanofibrillated cellulose:PVOH is greater than 0.2 and up to 2.

Embodiment No. 118 is the ply bonding adhesive composition according to any of Embodiment Nos. 108 to 117, wherein nanofibrillated cellulose is present in an amount of greater than 0.4 percent by weight based on the weight of the aqueous composition.

Embodiment No. 119 is the ply bonding adhesive composition according to any of Embodiment Nos. 108 to 118, wherein nanofibrillated cellulose is present in an amount of greater than 0.4 percent by weight based on the weight of the aqueous composition and up to 1.5 percent by weight based on the weight of the aqueous composition.

Embodiment No. 120 is the ply bonding adhesive composition according to any of Embodiment Nos. 108 to 119, wherein the ply bonding adhesive contains from 0.25 percent by weight to 3 percent by weight of nanofibrillated cellulose based on the weight of the aqueous composition.

Embodiment No. 121 is the ply bonding adhesive composition according to any of Embodiment Nos. 108 to 120, wherein the ply bonding adhesive contains from 0.25 percent by weight to 2.5 percent by weight of nanofibrillated cellulose based on the weight of the aqueous composition.

Embodiment No. 122 is the ply bonding adhesive composition according to any of Embodiment Nos. 108 to 121, wherein the ply bonding adhesive contains from 0.35 percent by weight to 1.5 percent by weight of nanofibrillated cellulose based on the weight of the aqueous composition.

Embodiment No. 123 is the ply bonding adhesive composition according to any of Embodiment Nos. 108 to 122, wherein the ply bonding adhesive contains from 0.35 percent by weight to 1 percent by weight of nanofibrillated cellulose based on the weight of the aqueous composition.

Embodiment No. 124 is the ply bonding adhesive composition according to any of Embodiment Nos. 108 to 123, wherein the ply bonding adhesive contains from 0.35 percent by weight to 0.75 percent by weight of nanofibrillated cellulose based on the weight of the aqueous composition.

Embodiment No. 125 is the ply bonding adhesive composition according to any of Embodiment Nos. 108 to 124, wherein the ply bonding adhesive contains from 0.4 percent by weight to 0.6 percent by weight of nanofibrillated cellulose based on the weight of the aqueous composition.

Embodiment no. 126 is the ply bonding adhesive composition according to any of Embodiment Nos. 108 to 125, wherein the adhesive comprises from 90-98.5% by weight of the composition water, from to 0.5% to 10% by weight of the composition polyvinyl alcohol and from 0.25% to 2.5% by weight of the composition nanofibrillated cellulose.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A method of making absorbent sheet comprising:
   (a) feeding a first absorbent cellulosic basesheet to an embossing nip;
   (b) embossing a pattern of raised embossments in said first basesheet;
   (c) applying an aqueous adhesive containing polyvinyl alcohol and nanofibrillated cellulose to the raised embossments of said first sheet; and
   (d) plying a second absorbent cellulosic basesheet with said first sheet by pressing said second cellulosic sheet to the adhesive disposed on the raised embossments of said first cellulosic sheet,
   wherein the aqueous adhesive containing polyvinyl alcohol and nanofibrillated cellulose comprises (a) water; (b) polyvinyl alcohol in an amount of from 1.5% to 10% by weight based on the weight of the adhesive composition; and (c) from 1% to 50% by weight of nanofibrillated cellulose based on the weight of polyvinyl alcohol in the adhesive.

2. The method of making a multi-ply absorbent sheet according to claim 1, wherein said nanofibrillated cellulose exhibits a Characteristic Nanofiber Viscosity reduction of at least 80% as the shear rate is increased from $5 \text{ sec}^{1}$ to $500 \text{ sec}^{-1}$.

3. The method of making a multi-ply absorbent sheet according to claim 1, wherein said nanofibrillated cellulose has a Characteristic Breaking Length of at least 3 km.

4. The method of making a multi-ply absorbent sheet according to claim 3, wherein said nanofibrillated cellulose has a Characteristic Breaking Length of from 3 km to 10 km.

5. The method of making a multi-ply absorbent sheet according to claim 4, wherein said nanofibrillated cellulose has a Characteristic Breaking Length of from 4.5 km to 9 km.

6. The method of making a multi-ply absorbent sheet according to claim 5, wherein said nanofibrillated cellulose has a Characteristic Breaking Length of from 6.5 km to 7.5 km.

7. The method of making a multi-ply absorbent sheet according to claim 1, wherein the polyvinyl alcohol in the adhesive comprises partially hydrolyzed polyvinyl alcohol having a degree of hydrolysis between 70 and 98 mol %.

8. The method of making a multi-ply absorbent sheet according to claim 1, wherein the adhesive contains from 1.5% by weight to 5% by weight of nanofibrillated cellulose, based on the weight of polyvinyl alcohol.

9. The method of making a multi-ply absorbent sheet according to claim 1, wherein the adhesive contains from 1.75% by weight to 2.5% by weight of nanofibrillated cellulose, based on the weight of polyvinyl alcohol.

10. The method of making a multi-ply absorbent sheet according to claim 1, wherein the adhesive is applied between the plies as an aqueous solution containing from 1.5% to 10% by weight of the composition polyvinyl alcohol.

11. The method of making a multi-ply absorbent sheet according to claim 10, wherein the adhesive is applied between the plies as an aqueous solution containing from 1.5% to 6% by weight of the composition polyvinyl alcohol.

12. The method of making a multi-ply absorbent sheet according to claim 10, wherein the adhesive is applied between the plies as an aqueous solution containing from 1.5% to 3% by weight of the composition polyvinyl alcohol.

13. A ply bonding adhesive for the manufacture of multi-ply paper tissue and multi-ply paper towel comprising:
  (a) water;
  (b) polyvinyl alcohol in an amount of from 1.5% to 10% by weight based on the weight of the adhesive composition; and
  (c) from 1% to 50% by weight of nanofibrillated cellulose based on the weight of polyvinyl alcohol in the adhesive.

14. The ply bonding adhesive according to claim 13, wherein the adhesive comprises from 90-98.5% by weight of the composition water, from to 1.5% to 6% by weight of the composition polyvinyl alcohol and from 1% to 30% by weight of nanofibrillated cellulose based on the weight of polyvinyl alcohol in the adhesive.

15. The ply bonding adhesive according to claim 13, wherein the adhesive comprises from 94-98.5% by weight of the composition water, from to 1.5% to 6% by weight of the composition polyvinyl alcohol and from 1% to 30% by weight of nanofibrillated cellulose based on the weight of polyvinyl alcohol in the adhesive.

16. A ply bonding adhesive composition for the manufacture of multi-ply paper tissue and multi-ply paper towel comprising:
  (a) water;
  (b) polyvinyl alcohol; and
  (c) nanofibrillated cellulose,
wherein the adhesive comprises from 90-98.5% by weight of the composition water, at least 0.5% by weight of the composition polyvinyl alcohol and from 0.05% to 2.5% by weight of the composition nanofibrillated cellulose.

17. The ply bonding adhesive composition according to claim 16, wherein the weight ratio of nanofibrillated cellulose:PVOH is greater than 0.025 and up to 2.

18. The ply bonding adhesive composition according to claim 17, wherein the weight ratio of nanofibrillated cellulose:PVOH is greater than 0.25 and up to 2.

19. The ply bonding adhesive composition according to claim 17, wherein nanofibrillated cellulose is present in an amount of greater than 0.4 percent by weight based on the weight of the aqueous composition and up to 1.5 percent by weight based on the weight of the aqueous composition.

20. The ply bonding adhesive composition according to claim 16, wherein said nanofibrillated cellulose has a Characteristic Breaking Length of from 3 km to 10 km.

* * * * *